United States Patent
Arav

(10) Patent No.: US 10,482,164 B2
(45) Date of Patent: *Nov. 19, 2019

(54) HYPERLINK WITH GRAPHICAL CUE

(71) Applicant: Aloft Media, LLC, Longview, TX (US)

(72) Inventor: Gal Arav, Raanana (IL)

(73) Assignee: Aloft Media, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,451

(22) Filed: Jun. 11, 2019

(65) Prior Publication Data

US 2019/0294655 A1    Sep. 26, 2019

Related U.S. Application Data

(63) Continuation of application No. 16/243,044, filed on Jan. 8, 2019, now Pat. No. 10,372,793, which is a continuation of application No. 16/056,487, filed on Aug. 6, 2018, which is a continuation of application No. 14/224,002, filed on Mar. 24, 2014, now Pat. No. 10,042,823, which is a continuation of application No. 12/334,068, filed on Dec. 12, 2008, now Pat. No. 8,682,961, which is a continuation of application No.

(Continued)

(51) Int. Cl.
| | |
|---|---|
| *G01R 31/08* | (2006.01) |
| *G06F 17/22* | (2006.01) |
| *G06F 3/0484* | (2013.01) |
| *G06Q 10/10* | (2012.01) |

(52) U.S. Cl.
CPC ...... *G06F 17/2235* (2013.01); *G06F 3/04842* (2013.01); *G06Q 10/107* (2013.01)

(58) Field of Classification Search
CPC .................................................. G06F 17/2235
See application file for complete search history.

(56) References Cited

U.S. PATENT DOCUMENTS 6,029,182 A * 2/2000 Nehab ................ G06F 16/9535
715/205
6,564,213 B1   5/2003 Ortega et al.
(Continued)

OTHER PUBLICATIONS

Archive Website "Lucent" archived Jun. 1, 2005, available at http://web.archive.org/web/20050601010217/http://www.lucent.com/.

(Continued)

*Primary Examiner* — Gerald A Smarth
(74) *Attorney, Agent, or Firm* — Patrick E. Caldwell, Esq.; The Caldwell Firm, LLC

(57) ABSTRACT

A system, method, and computer program product are provided for causing display of a first set of representations of a first set of hyperlinks. In operation, a first input from a user is received indicating a selection of one of the first set of hyperlink representations and causes, in response to receiving the first input, display of a second set of representations of a second set of hyperlinks. Further, a second input from the user is received indicating a selection of one of the second set of hyperlink representations, and causes, in response to receiving the second input, navigation to a destination specified by the selected one of the second set of hyperlink representations.

88 Claims, 8 Drawing Sheets

Related U.S. Application Data

11/384,957, filed on Mar. 20, 2006, now Pat. No. 7,529,795.

(56) References Cited

U.S. PATENT DOCUMENTS

| | | | |
|---|---|---|---|
| 6,640,250 B1* | 10/2003 | Chang | G06F 3/0482 |
| | | | 709/203 |
| 6,704,727 B1 | 3/2004 | Kravets | |
| 7,032,183 B2 | 4/2006 | Durham | |
| 7,035,864 B1 | 4/2006 | Ferrari et al. | |
| 7,647,312 B2 | 1/2010 | Dai | |
| 8,438,487 B1 | 5/2013 | Lin-Hendel | |
| 8,539,024 B2 | 9/2013 | Smit et al. | |
| 9,348,911 B2 | 5/2016 | Egendorf et al. | |
| 10,042,823 B2 | 8/2018 | Arav | |
| 10,078,623 B2 | 9/2018 | Arav | |
| 2002/0010639 A1 | 1/2002 | Howey et al. | |
| 2006/0090142 A1 | 4/2006 | Glasgow et al. | |
| 2019/0034391 A1 | 1/2019 | Arav | |

OTHER PUBLICATIONS

Archive Website, "Intel.com" archived Jun. 1, 2005, available at http://web.archive.org/web/20050601085413/http://www.intel.com/.

Archived Webpage, "CNET", archived Mar. 1, 2005 available at https://web.archive.org/web/20050301011005/http://www.cnet.com/2001-1_1-0.html.

Archived webpage, "Macromedia Flash MX 2004," Mar. 5, 2005, available at https://web.archive.org/web/20050306024404/http:/www.macromedia.com:80/software/flash/.

Archived Webpage, "pure CSS menus," Meyerweb, archived Apr. 11, 2003, available at https://web.archive.org/web/20030411094446/http://www.meyerweb.com:80/eric/css/edge/menus/demo.html.

Archived Website "Son of Suckerfish Dropdowns" archived Nov. 25, 2005, available at https://web.archive.org/web/20051125083251/htmldog.com/articles/suckerfish/dropdowns/.

Archived Website "The Wall Street Journal Online" archived Jun. 1, 2005, available at http://web.archive.org/web/20050601154824/http://online.wsj.com/public/us.

Archived Website "TV Guide" archived May 31, 2005, available at http://web.archive.org/web/20050531224613/http://tvguide.com/.

Archived Website, "(mt) Media Temple," archived Jun. 3, 2003, available at https://web.archive.org/web/20030603184613/http:/www.mediatemple.net:80/services/webhosting/, last accessed Dec. 11, 2017.

Archived Website, "About this page," archived Nov. 19, 2002, available at https://web.archive.org/web/20021119135440/http:/www.surguy.net:80/menu/index.html.

Archived Website, "Auto Complete Javascript text field," archived Mar. 10, 2005, available at https://web.archive.org/web/20050310050127/http:/www.vonloesch.de:80/node/18.

Archived Website, "Bloglines," archived Jan. 26, 2005, available at https://web.archive.org/web/20050126160350/http://www.bloglines.com:80/blog/pretsel.

Archived Website, "Cool CSS Menu," archived Dec. 23, 2004, available at https://web.archive.org/web/20041223100517/http:/javascriptkit.com:80/script/script2/coolcssmenu.shtml.

Archived Website, "Creating a Textbook with JavaScript Auto-Complete," archived Aug. 13, 2004, available at https://web.archive.org/web/20040813010032/http:/www.webreference.com:80/programming/javascript/gr/column5/index.html.

Archived Website, "CSS / DHTML Hybrid Navigation Bar," archived Apr. 10, 2003, available at https://web.archive.org/web/20030410141237/http://www.brothercake.com:80/scripts/navmeister/page.php.

Archived Website, "CSS / DHTML Hybrid Navigation Bar," Brothercake, archived Apr. 10, 2003, available at https://web.archive.org/web/20030410141237/http://www.brothercake.com:80/scripts/navmeister/page.php.

Archived Website, "Drop-down Menus, Horizontal Style," archived Jul. 1, 2004, available at https://web.archive.org/web/20040701070926/http:/www.alistapart.com:80/articles/horizdropdowns/.

Archived Website, "Dynamic HTML Menu Trees," archived May 1, 1999, available at https://web.archive.org/web/19990501040932/http://developer.netscape.com:80/docs/examples/dynhtml/tree.html.

Archived Website, "Live Request : XMLHttpRequest and You," archived Oct. 19, 2004, available at https://web.archive.org/web/20041019013459/http://www.creatimation.net:80/journal/live-request.

Archived Website, "Live Request : XMLHttpRequest and You," Creatimation, Archived Oct. 19, 2004, available at https://web.archive.org/web/20041019013459/http://www.creatimation.net:80/journal/live-request.

Archived Website, "Live Request Zip Folder," archived Oct. 19, 2004, available at https://web.archive.org/web/20050421062822/http://creatimation.net/extra/live-request/live-request.zip.

Archived Website, "Live Search HTML page," archived Oct. 19, 2004, available at https://web.archive.org/web/20041019013459/http://www.creatimation.net:80/journal/live-request.

Archived Website, "Live Update Demo," archived Mar. 15, 2005, available at https://web.archive.org/web/20050315035633/http://www.papermountain.org:80/static/live_update_demo.rb.html.

Archived Website, "MacroMedia," archived Mar. 6, 2005, available at https://web.archive.org/web/20050306034424/http:www.macromedia.com:80/software/Dreamweaver, last accessed Dec. 11, 2017.

Archived website, "Macromedia," Mar. 6, 2005, available at https://web.archive.org/web/20050306034424/http:/www.macromedia.com:80/software/Dreamweaver.

Archived Website, "PaperMountain Live Updater JS," archived Mar. 16, 2005, available at https://web.archive.org/web/20050316112910/http://www.papermountain.org:80/static/liveUpdater.js.

Archived Website, "PGA Championship" Dec. 31, 2004, available at https://web.archive.org/web/20041231004608/www.pga.com/pgachampionship/2004.

Archived Website, "PGA Championship," archived Dec. 31, 2004, available at https://web.archive.org/web/20041231004608/www.pga.com/pgachampionship/2004, last accessed Dec. 11, 2017.

Archived Website, "pure CSS menus," archived Apr. 11, 2003, available at https://web.archive.org/web/20030411094446/http://www.meyerweb.com:80/eric/css/edge/menus/demo.html.

Archived Website, "Pure CSS Menus," archived Jul. 1, 2004, available at https://web.archive.org/web/20040701021837/http:/www.meyerweb.com:80/eric/css/edge/menus/demo.html.

Archived Website, "RadioShack," archived Feb. 11, 2004, available at https://web.archive.org/web/20040211113445/http:/www.radioshack.com:80/.

Archived Website, "RadioShack," archived Mar. 19, 2005, available at https://web.archive.org/web/20050319030241/http:/www.radioshack.com:80/, last accessed Dec. 11, 2017.

Archived Website, "Son of Suckerfish Dropdowns," archived Jun. 15, 2004, available at https://web.archive.org/web/20040615072300/http:/www.htmldog.com/articles/suckerfish/dropdowns/.

Archived Website, "Sons of Suckerfish," archived Jun. 3, 2004, available at https://web.archive.org/web/20040603230612/http://htmldog.com/articles/suckerfish/.

Archived Website, "Suckerfish Dropdowns," A List Apart, archived Nov. 18, 2003, available at https://web.archive.org/web/20031118185224/http://www.alistapart.com:80/articles/dropdowns.

Archived Website, "Suckerfish Dropdowns," archived Nov. 18, 2003, available at https://web.archive.org/web/20031118185224/http:/www.alistapart.com:80/articles/dropdowns.

Archived website, "Suckerfish" archived Nov. 25, 2005, available at https://web.archive.org/web/20051125081404/htmldog.com/articles/suckerfish/dropdowns/example/bones3.html.

Archived Website, "Take a tour of the Dreamweaver MX 2004 features," archived Jul. 15, 2004, available at http://web.archive.org/web/20040715001246/http:/www.macromedia.com:80/software/dreamweaver/productinfo/features/.

Archived Website, "This uses just CSS 2 to turn nested lists into a working menu and does Not use any JavaScript," archived Mar. 24,

(56) References Cited

OTHER PUBLICATIONS 2003, available at https://web.archive.org/web/20030324200540/http:/www.howtocreate.co.uk/tutorials/testMenu.html.
Archived Website, "TI Semiconductors" archived May 31, 2005, available at http://web.archive.org/web/20050531235140/http://www.ti.com/.
Archived Website, "XMLHttpRequest Demo," archived Mar. 23, 2005, available at https://web.archive.org/web/20050323073452/http://www.papermountain.org/demos/live/.
Archived Website, "XMLHttpRequest Demo," PaperMountain, Archived Mar. 23, 2005, available at https://web.archive.org/web/20050323073452/http://www.papermountain.org/demos/live/.
Archived Website, "YADM—Yet another dynamic menu," archived Sep. 17, 2004, available at https://web.archive.org/web/20040917085709/http:/www.onlinetools.org:80/tools/yadm/.
Arguelles, Tony, "Building a DHTML Drop Down Menu with Dreamweaver," InformIT, Oct. 25, 2002, available at http://www.informit.com/articles/article.aspx?p=29835.
Blog, A List Apart, Eric Shepherd "Hybrid CSS Dropdowns" Mar. 30, 2005 available at https://web.archive.org/web/20050401043047/http://www.alistapart.com/articles/hybrid/.
Brower, Stewart, "Academic health sciences library Website navigation: an analysis of forty-one Websites and their navigation tools," J Med Libr Assoc 92(4) Oct. 2004, available at https://www.ncbi.nlm.nih.gov/pmc/articles/PMC521512/.
Jukka "Yucca" Korpela, "Navigational pulldown menus in HTML," published Mar. 1, 2003, available at http://jkorpela.fi/forms/navmenu.html, last accessed Dec. 11, 2017.
Lisa Wollin, "Creating a drop-down list that links to other pages," MSDN Archive, Aug. 19, 2004, available at https://blogs.msdn.microsoft.com/lisawoll/2004/08/19/creating-a-drop-down-list-that-links-to-other-pages/, last accessed Dec. 11, 2017.
Lisa Wollin, "Creating a JavaScript Drop-Down Menu in FrontPage," Microsoft Corporation, Dec. 2004, available at https://msdn.microsoft.com/en-us/library/office/aa218659(v=office.11).aspx, last accessed.
Lisa Wollin, "Creating a JavaScript Drop-Down Menu in FrontPage," Microsoft Corporation, Dec. 2004, available at https://msdn.microsoft.com/en-us/library/aa218659(v=office.11).aspx, last accessed Dec. 11, 2017.
Patrick Griffiths and Dan Webb, "Suckerfish Dropdowns," published Nov. 7, 2003, available at https://alistapart.com/article/dropdowns, last accessed Dec. 11, 2017.
Professional CSS: Cascading Style Sheets for Web Design, 1st Edition (Wrox: Jul. 29, 2005), by Christopher Schmitt et al., ISBN-13 978-0764588334.
Referenced Page, "HTMLDog," date unknown, available at http://www.htmldog.com/articles/suckerfish/bones/, last accessed Dec. 11, 2017, page referenced on https://alistapart.com/article/dropdowns, last accessed Dec. 11, 2017.
Rigby, Nick "Drop-Down Menus, Horizontal Style" alistapart, Jun. 29, 2004, available at https://alistapart.com/article/horizdropdowns.
Rigby, Nick, "Drop-Down Menus, Horizontal Style," Jun. 29, 2004, available at https://alistapart.com/article/horizdropdowns.
Schmitt et al, "Professional CSS—Cascading Style Sheets for Web Design", Wiley Publishing, 434 pages, published Jul. 28, 2005.
Stewart M. Brower "Academic health sciences library Website navigation: an analysis of forty-one Websites and their navigation tools," J Med Libr Assoc 92(4) Oct. 2004, pp. 412-420.
Ton Arguelles, "Essential Macromedia Dreamweaver for Web Professionals," Prentice Hall, 368 pages, Published Dec. 15, 2001.
Tony Arguelles "Essential Dreamweaver 4 for Web Professionals" 2002 ISBN-10: 0130315729ISBN-13: 978-0130315724 ASIN: B00V0Y4C18.
Tony Arguelles, "Building a DHTML Drop Down Menu with Dreamweaver," Oct. 25, 2002, available at http://www.informit.com/articles/article.aspx?p=29835, last accessed Dec. 11, 2017.
U.S. Appl. No. 16/056,491.
WayBackMachine, homepage for Arkitrave, http://www.arkitrave.com:80/, captured Mar. 28 2004, available at https://web.archive.org/web/20040328084551/http://www.arkitrave.com:80/.
WayBackMachine, homepage for Chevrolet, http://www.chevrolet.com:80/, captured Jan. 1, 2005, available at https://web.archive.org/web/20050101085416/http://www.chevrolet.com:80/.
WayBackMachine, homepage for Marriott, http://shopmarriott.com:80/index.aspx/, captured Nov. 25, 2005, available at https://web.archive.org/web/20051125000055/http://shopmarriott.com:80/index.aspx.
WayBackMachine, homepage for Walmart, http://www.walmart.com:80/, captured Mar. 21, 2004, available at https://web.archive.org/web/20040321210247/http://www.walmart.com:80/.
Webpage, "Drop Down Menu Sample—2 Menus (or more)" retrieved Oct. 12, 2018, available at http://www.echoecho.com/sampledropdown.htm.
Webpage, "Drop Down Menu," EchoEcho.com, retrieved Oct. 12, 2018, available at http://www.echoecho.com/htmlforms11.htm.
Webpage, "How is JavaScript different from Java," retrieved Oct. 12, 2018, available at https://www.java.com/en/download/faq/Java_javascript.xml.
Webpage, "HTML Forms Drop Down Menu," EchoEcho.com, retrieved Oct. 12, 2018, available at http://www.echoecho.com/tooldropdown.htm.
Webpage, "Navigational pulldown menus in HTML" Mar. 1, 2003, available at http://jkorpela.fi/forms/navmenu.html.
Webreference webpage, "Creating a Textbox with JavaScript Auto-Complete", Apr. 6, 2004, available at http://webreference.com/programming/javascript/gr/column5/index.html.
Wollin, Lisa "Creating a JavaScript Drop-Down Menu in FrontPage" Microsoft Corporation, Dec. 2004, available at https://docs.microsoft.com/en-us/previous-versions/office/developer/office-2003/aa218659(v=office.11).
Wollin, Lisa "Creating a drop-down list that links to other pages," MSDN Archive, Aug. 19, 2004, available at https://blogs.msdn.microsoft.com/lisawoll/2004/08/19/creating-a-drop-down-list-that-links-to-other-pages/.
Zakas, Nicholas "Creating an Autosuggest Textbox with JavaScript, Part 2" UCLA course resource, Apr. 2004, available at http://web.cs.ucla.edu/classes/winter15/cs144/projects/javascript/suggest2.html.
Zakas, Nicholas "Make Life Easy With Autocomplete Textboxes", Sitepoint webpage, Sep. 16, 2003, available at https://webcache.googleusercontent.com/search?q=cache:sCxOuuDrjOgJ:https://www.sitepoint.com/life-autocomplete-textboxes/+&cd=1&hl=en&ct=clnk&gl=us.

\* cited by examiner

FIG. 5A

HYPERLINK WITH GRAPHICAL CUE

RELATED APPLICATIONS

The present application claims priority to and is a continuation of U.S. application Ser. No. 16/243,044 filed Jan. 8, 2019, which in turn is a continuation of U.S. application Ser. No. 16/056,487 filed Aug. 6, 2018, which in turn is a continuation of U.S. application Ser. No. 14/224,002 filed Mar. 24, 2014, now issued under U.S. Pat. No. 10,042,823, which is a continuation of U.S. application Ser. No. 12/334,068 filed Dec. 12, 2008, now issued under U.S. Pat. No. 8,682,961, which is a continuation of U.S. application Ser. No. 11/384,957 filed Mar. 20, 2006, now issued under U.S. Pat. No. 7,529,795, both of which are incorporated herein by reference and which, in turn, incorporate by reference U.S. Provisional Application Ser. No. 60/784,141 filed Mar. 20, 2006 and U.S. Provisional Application Ser. No. 60/784,140 filed Mar. 20, 2006, all of which are incorporated herein by reference.

BACKGROUND

Field of the Invention

The present invention relates to computer-implemented techniques for improving the usefulness of hyperlinks in web pages.

Related Art

Web pages, and other kinds of hypertext documents, use textual representations of hyperlinks to indicate to the user which hyperlinks the user may follow. For example, if a web page includes the text, "Click here for more information," the word "here" may be underlined to indicate to the user that selecting (e.g., clicking on) the word "here" will cause the web browser to navigate via a hyperlink to another web page (referred to as the "anchor" of the hyperlink).

Textual hyperlinks have proven to be extremely useful and powerful tools. In fact, in the first incarnation of the World Wide Web, web pages could only contain text. In such web pages, all hyperlinks were visually represented using text displayed with a special characteristic (e.g., underlining or a special color) indicating that the text represented a hyperlink. Textual representations of hyperlinks have the benefit, for example, of allowing hyperlinks to be visually embedded within otherwise normal prose text, such as news articles and email messages, without visually interrupting the flow of such text.

Textual representations of hyperlinks, however, have certain drawbacks. For example, the textual representation of a hyperlink may not make the destination (anchor) of the hyperlink clear to the user. In the case of the text "Click here for more information," where the word "here" represents a hyperlink, the text does not convey the destination of the hyperlink to the user. Instead, the user only knows that clicking on the word "here" will cause the web browser to leave the current web page and navigate to another one. To identify the destination of the web page, the user may be required to navigate to that web page (by selecting the hyperlinked text) and view it, or to perform a cumbersome operation such as cutting and pasting the URL of the hyperlink into a document. In either case, it is tedious and time-consuming for the user to identify the destination of the hyperlink and therefore to decide whether to navigate to that destination.

Some have attempted to address these problems with textual representations of hyperlinks by using graphical representations of hyperlinks. For example, a picture of a person on a web page may represent a hyperlink to that person's home page. Clicking on the picture will cause the web browser to navigate to the hyperlinked home page. Graphical hyperlinks have the benefit, in comparison to purely textual hyperlinks, of providing the user with a clearer indication of the hyperlink's destination. On the other hand, graphic images must typically occupy a significant area on the web page (so-called visual "real estate") before they can provide enough visual information to be useful to the user as an indication of the hyperlink's destination. Graphical hyperlinks, therefore, are of limited value in web pages and other situations in which visual real estate is at a premium and must be used as efficiently as possible.

What is needed, therefore, are improved techniques for providing visual representations of hyperlinks.

SUMMARY

A computer program provides a first set of representations (e.g., textual representations) of a first set of hyperlinks. In response to selection by a user of one of the first set of hyperlink representations (such as by clicking on or hovering a cursor over the representation), the program displays a second set of representations (e.g., graphical representations) of a second set of hyperlinks. The user may select one of the second set of representations, in response to which the program navigates to the destination of the hyperlink. The second set of representations may, for example, be logos of companies, and the second set of hyperlinks may be hyperlinks to the companies' web sites.

BRIEF DESCRIPTION OF THE DRAWINGS

FIGS. 5A-5B are illustrations of web page hyperlinks displayed by embodiments of the present invention.

DETAILED DESCRIPTION

Figure 1:
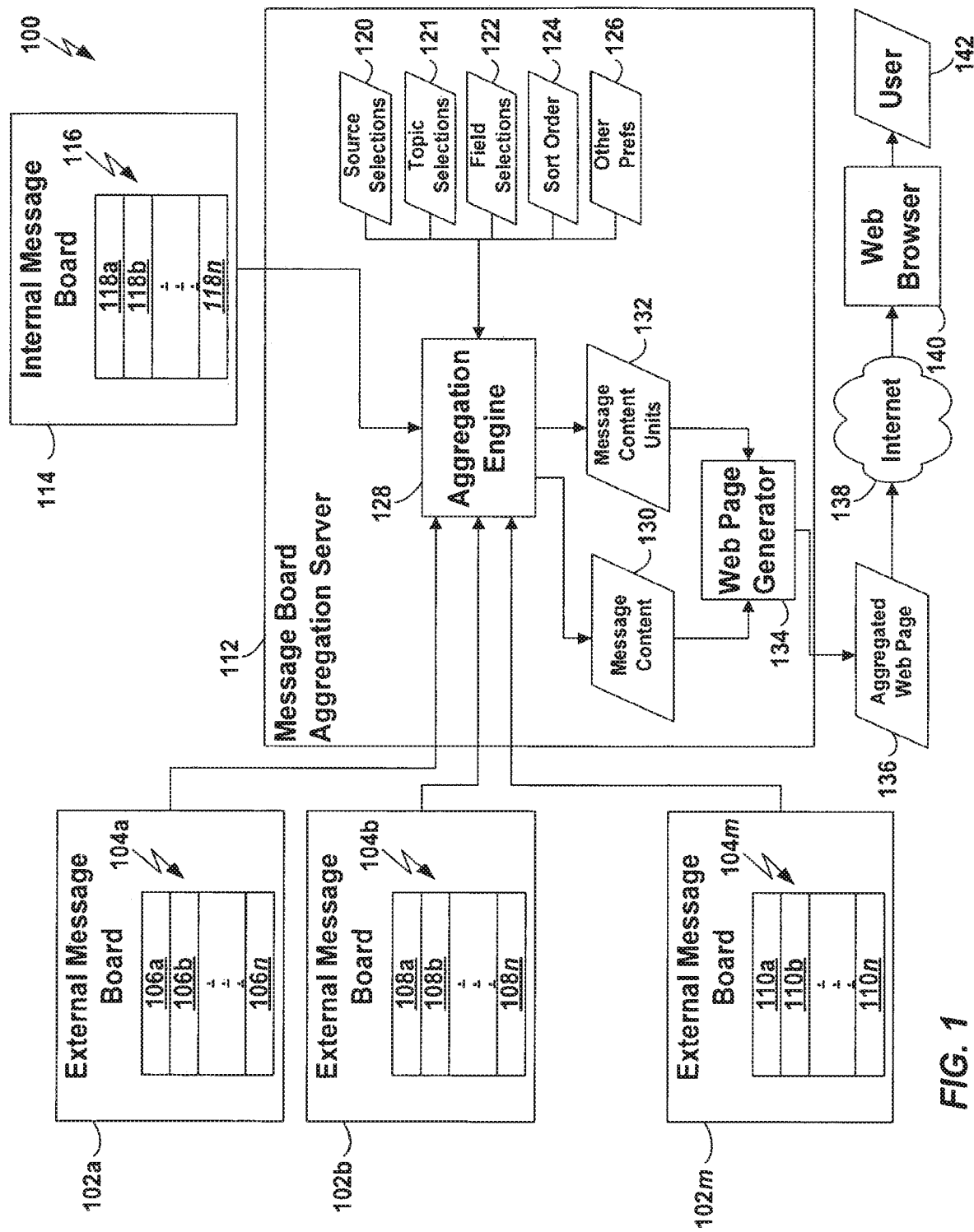
FIG. 1 is a dataflow diagram of a message board aggregation system according to one embodiment of the present invention.
Figure 2:
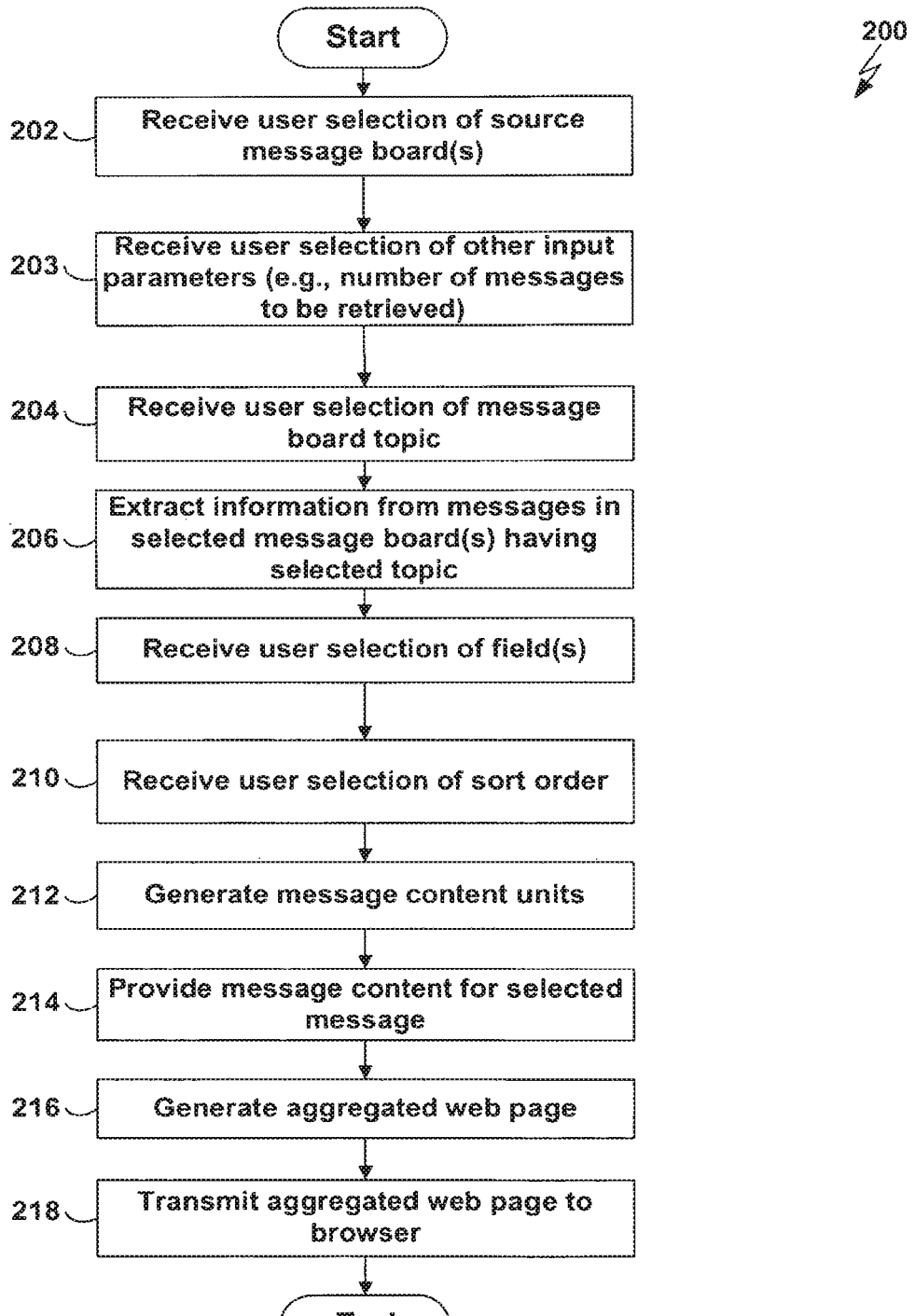
FIG. 2 is a flowchart of a method performed by the system of FIG. 1 according to one embodiment of the present invention.
Figure 3:
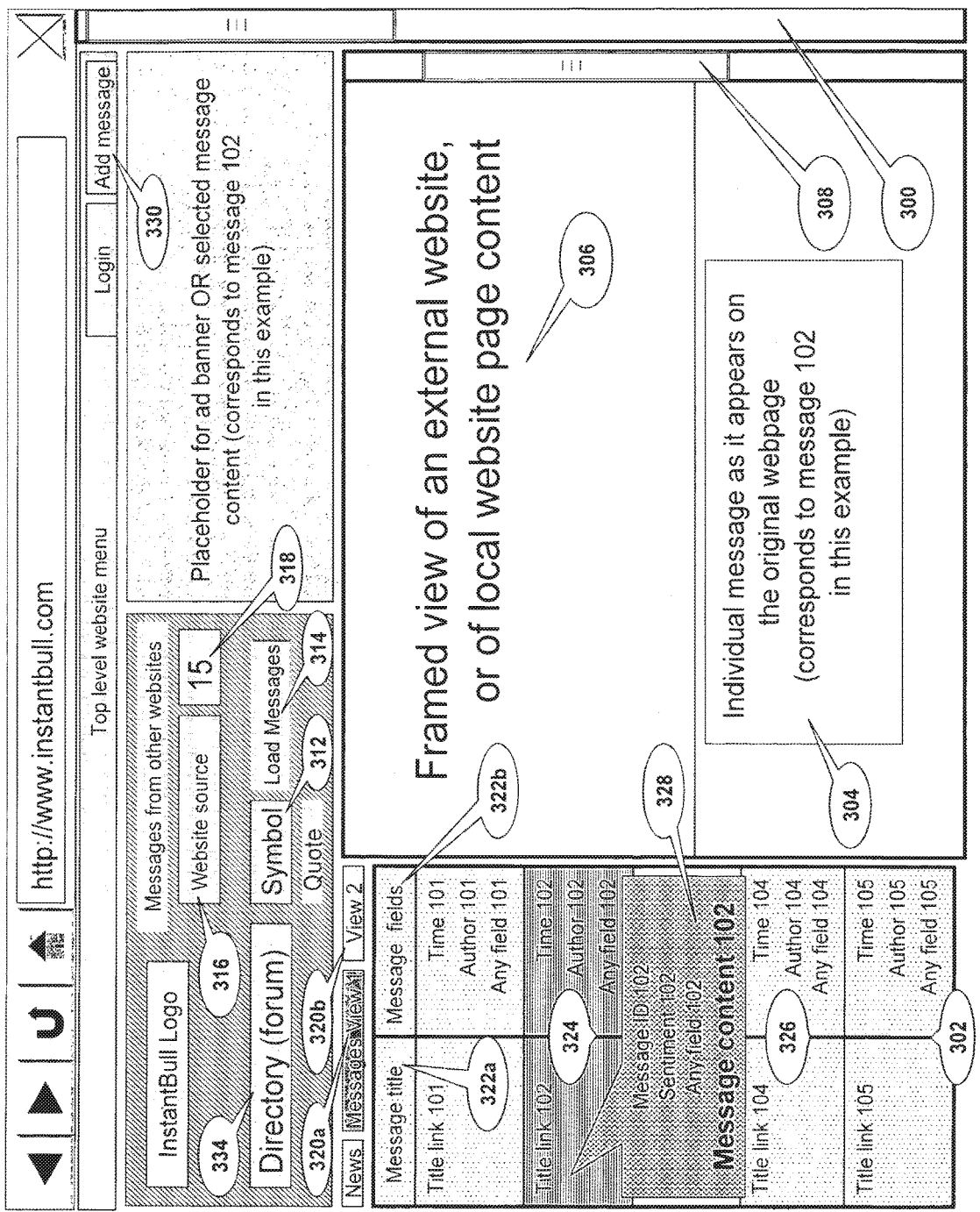
FIG. 3 is a window displayed by the message board aggregation system of FIG. 1 according to one embodiment of the present invention.

Referring to FIG. 1, a dataflow diagram is shown of a message board aggregation system 100 according to one embodiment of the present invention. Referring to FIG. 2, a flowchart is shown of a method 200 performed by the system 100 of FIG. 1 according to one embodiment of the present invention. Referring to FIG. 3, a window 300 displayed by the message board aggregation system 100 of FIG. 1 is illustrated according to one embodiment of the present invention.

In general, the window 300 shown in FIG. 3 contemporaneously displays a table 302 containing message table content (e.g., message title, message author, message ID, message sentiment, message time of writing, message web page source, person being replied to) and message content 304 corresponding to a message represented by one of the entries in the message table 302. In the embodiment illustrated in FIG. 3, the message content 304 is displayed in a web page 306 from a message board web site to which the message content 304 was originally posted. In the embodiment illustrated in FIG. 3, the source web page 306 (containing the message content 304) is displayed in a first frame 308 of the web page 300, and the message table 302 is displayed in a second frame 310 of the web page 300.

The web page 306 is an example of a "source" web page as that term is used herein. The message table 302 may include summaries of messages originally posted to more than one source web page. The web page 300, therefore, provides an aggregation service which aggregates messages from a plurality of web-based message boards. The web page 300, therefore, is referred to herein as an "aggregation" web page.

Having described certain general features of particular embodiments of the present invention, techniques that may be used to implement embodiments of the present invention will now be disclosed. Referring to FIG. 1, multiple external message boards 102a-m are illustrated. For ease of illustration and explanation, each of the message boards 102a-m is illustrated simply as a set of messages. More specifically, message board 102a includes a set of messages 104a, including messages 106a-n; message board 102b includes a set of messages 104b, including messages 108a-n; and message board 102m includes a set of messages 104m, including messages 110a-n. In practice, the message boards 102a-m may be implemented using web servers or any other appropriate kind of technology.

Furthermore, although only three external message boards 102a, 102b, and 102m are shown in FIG. 1 for purposes of example, the system 100 may include and/or access any number of external message boards, as indicated by the variable m. Furthermore, the term "message board" is not limited to any-particular kind of communications mechanism, and includes not only web-based message boards, but also newsgroups and email. Although each of the message boards 102a-m is shown in FIG. 1 as including the same number of messages n, the number of messages may vary among the message boards 102a-m.

A single message board, such as a web-based financial message board, may include a plurality of topics, each of which may include a plurality of threads or sub-topics. For ease of illustration and explanation, each of the message boards 102a-m is illustrated in FIG. 1 as containing only a single thread of messages. This does not represent a limitation of the present invention. Rather, the techniques disclosed herein may be applied to message boards including any number of topics, threads, or other groupings of messages.

The aggregation system 100 also includes a message board aggregation server 112 and a corresponding message board 114 (which includes set 116 of messages 118a-n). The message board 114 is managed by the aggregation server 112 or by the same entity that manages the aggregation server. Therefore, the message board 114 will be referred to herein as an "internal" message board, while the message boards 102a-m will be referred to herein as "external" message boards in relation to the aggregation server 112. As will be described in more detail below, the aggregation server 112 aggregates messages from two or more of the message boards 102a-m and 114, and displays content from the aggregated messages in the web page 300.

Referring again to FIG. 2, the system 100 of FIG. 1 may perform the method 200 to aggregate content from the message boards 102a-m and 114 to display aggregated message content in the window 300. A user 142 uses a web browser 140 to browse over the Internet 138 to a web site served by the aggregation server 112. The web page 300 is an example of a web page that may be part of such a web site. Upon visiting the web site, the user 142 selects one or more source message boards from which to view message content and summaries (step 202). The user 142 may, for example, make this selection by selecting the name of an external message board (such as one of the external message boards 102a-m) from a selection of sources accessible in any of a variety of formats, one example of which is a drop-down list 316. Note, however, that the user 142 may select more than one source message board.

In the particular example illustrated in FIG. 3, the web page 300 combines content extracted from the single external message board indicated by the selection in the drop-down list 316 with content extracted from the internal message board 114 associated with the aggregation server 112. Furthermore, in the example illustrated in FIG. 3, the user 142 may use drop-down list 318 to select the number of message summaries to be displayed in message table 302.

The user 142 selects other input parameters (such as the number of messages to be retrieved) (step 203). As described in more detail below, the aggregation server 112 may store the other input parameters in a set of other preferences 126.

The user 142 selects a particular message board topic to view (step 204). The user 142 may, for example, make this selection by identifying a particular company, such as by typing the company's name or stock ticker symbol in text field 312 and clicking button 314. This is only one of many ways in which the user may select a message board topic to view.

Furthermore, in the embodiment illustrated in FIG. 3, the web page 300 also includes a directory (forum) 334 user interface control which may, for example, take the form of a drop-down list. For example, the directory control 334 may allow the user to select either a "stock" forum or a "sports" forum. If the user 142 selects the "stock" forum, then the web page 300 may enable selection of stock symbols in text field 312, while if the user 142 selects the "sports" forum, then the web page 300 may enable selection of sports symbols in text field 312. More generally, the user's selection in the directory control 334 dictates which group of symbols is available for selection in the text input field 312. The use of the directory control 334 is provided merely for purposes of example and does not constitute a limitation of the present invention.

The user's message board selection is transmitted by the web browser 140 over the Internet 138 to the message board aggregation server 112. In response to receiving the user's selection, the aggregation server 112 retrieves information derived from messages in the selected source message board(s) having the selected topic (step 206). In the embodiment illustrated in FIG. 3, the aggregation server 112 also retrieves message content from the internal message board 114. This is not, however, a requirement of the present invention. The internal message board 114 may, for example, be selectable or de-selectable as a source by the user 142 in the same manner as the external message boards 102a-m.

Note further that any subset of the external message boards 102a-m may be selectable as a source by the user 142. Such a subset may, for example, consist of all of the external message boards 102*a-m*, any one of the message boards 102*a-m*, or any combination of fewer than all of the message boards 102*a-m*.

The information extracted from the selected source message board(s) by the aggregation server may include any of a variety of information that may be of interest to the user 142. Examples of information that may be extracted from each on-topic message in the selected message board(s) includes, but is not limited to the message title, author, ID, sentiment, time of writing, web page source, person being replied to, and message statistics (e.g., the number of times others have recommended the message, or a rating of the popularity of the message).

At any time during performance of the method 200 illustrated in FIG. 2, the user 142 may select one or more fields to be displayed in the message table 302 (step 208). For example, in the embodiment illustrated in FIG. 3, the message table includes a column 322*a* labeled "Message Titles," which always displays the titles of the messages summarized in the table 302. The table 302 also includes, however, a second column 322*b* having content that may-be varied by the user 142. More specifically, the user 142 may select link 320*a* to cause the column 322*b* to display the authors of the messages being summarized in the table 302 (as illustrated in FIG. 3). Similarly, the user 142 may select link 320*b* to cause the column 322*b* to display the times at which the messages being summarized in the table 302 were posted.

The particular selection of fields allowed in the embodiment illustrated in FIG. 3 is merely an example and does not constitute a limitation of the present invention. Rather, the user 142 may be allowed to select any combination of message fields for display in the table 302. Other examples of two fields from which the user 142 may select include, but are not limited to: message Title and Author fields; message Title and Time Submitted fields; and message Author and Author Attribute fields. Furthermore, a single column in the table 302 may display content from more than one field. For example, a single "time and author" column may simultaneously display both message time and author.

At any time during performance of the method 200 illustrated in FIG. 2, the user 142 may select an order in which message summaries are to be sorted in the message table 302 (step 210). For example, in the embodiment illustrated in FIG. 3, the user 142 may select the heading of column 322*a* to cause the contents of the table 302 to be sorted by message title, or select the heading of column 322*b* to cause the contents of the table 302 to be sorted by the contents of column 322*b* (e.g., message author or posting time). Alternatively, for example, the contents of the table 302 may be sorted automatically by posting time. Once again, these particular sorting options are merely examples and do not constitute limitations of the present invention.

The aggregation server 112 keeps track of: (1) the source message board(s) selected by the user 142 in source selections 1-20; (2) the topic (e.g., company) selected by the user 142 in topic selection 121; (3) the field(s) selected by the user 142 in field selections 122; (4) the sort order 124 selected by the user 142 in sort order 124; and (5) any other preferences 126 specified by the user 142.

The aggregation server 112 includes an aggregation engine 128, which generates message content units 132 based on the information extracted in step 206 and the user preferences described above (step 212). For example, the message content units 132 may include a content unit for each message that matches the topic selection 121 (e.g., company) in any of the source message board(s) indicated by the source selection(s) 120. Each of the message content units 132 may include information only for the fields specified by the field selections 122, but this is not required. The message content units 132 may, for example, include extracted information for fields other than those specified by the field selections. The message content units 132 may include all of the information that was extracted in step 206.

As will be described in more detail below, the information in the message content units 132 forms the basis for the information displayed in the message table 302 on the web page 300 (FIG. 3). In the embodiment illustrated in FIG. 3, the frame 308 displays a web page 308 corresponding to one of the message summaries displayed in the message table 302. When the web page 300 is first displayed, the message content corresponding to the first message summary in the table 302 may be displayed by default in the frame 308. Thereafter, the user 142 may select any of the message summaries in the table 302, such as by clicking on the title of the message in column 322*a*, to cause message content for a different message to be displayed-in the frame 308.

The aggregation engine 128, therefore, provides message content 130 corresponding to the currently-selected message summary in the message table 302 (step 214). The aggregation engine 128 may, for example, provide the content 130 in the form of HTML and/or other web content by copying the content 130 from its source message board (e.g., one of the external message boards 102*a-m* or the internal message board 114). The content 130 may either be copied to a storage medium local to the aggregation server 112, or merely passed as a reference to the client web browser 140, which may retrieve the message content 130 directly from its source and display it in the frame 308, without using the aggregation server 112 to serve the content 130 to the user 142.

The aggregation server 112 includes a web page generator 134, which produces an aggregated web page 136 (including HTML and/or other web content) that includes both the message content units 132 and the message content 130 (or a link to the message content 130) (step 216). The aggregated web page 136 may, for example, include a first frame for displaying a table including information from the message content units 132, and a second frame for displaying the message content 130.

The aggregation server 112 transmits the aggregated web page 136 to the web browser 140 over the Internet (step 218). The web browser 140 displays a window (such as the window 300 shown in FIG. 3) including: (1) web content (such as the web page 306) representing a first message posted to a first online forum, such as the external message board 102*a*; and (2) a plurality of message summaries (such as are displayed in the table 302) including information derived from the first message (such as the message summary 324 of the message 304) and second information derived from a second message in the plurality of messages (such as the message summary 326 of another message not displayed in the window 300). The web content and the message summaries may be displayed in different frames in the same window.

As described above, the message content units 132 that are downloaded by the web browser 140 to the local machine of the user 142 may include more information than is displayed in the table 302. The table 302 may, for example, be designed to display only the information that is considered most important to the user 142, such as the title, author, and/or timestamp of the aggregated messages. The user 142 may, however, read a particular one of the message summaries in the table 302 and desire to obtain additional information about the corresponding message. Although the user 142 could obtain such additional information by clicking on the message summary, thereby causing the corresponding message web content to be displayed in the frame 308, this requires the web browser 140 to download and render additional web content. Acquiring additional information about many messages in this way may therefore be tedious and time-consuming.

Alternatively, the web page 300 allows the user 142 to quickly obtain additional summary information about any message listed in the table 302 by, for example, moving and holding ("hovering") the mouse cursor over the message's summary. For example, in the case illustrated in FIG. 3, the user 142 has hovered the mouse cursor over message summary 324, thereby causing the web page 300 to display a tooltip 328 containing additional summary information about the source message 304. In the example illustrated in FIG. 3, the tooltip 328 includes additional information such as the message ID, author, sentiment, date and time, and the beginning of the message text.

Because the additional summary information has been preloaded by the web browser 140 in the process of downloading the message content units 132 from the aggregation server 112, the web browser 140 may generate and display the tooltip essentially instantaneously, and without again accessing the server 112. This allows the user 142 to quickly browse such additional information for many messages listed in the table 302 quickly and easily, simply by moving the mouse cursor over the corresponding message summaries.

The aggregation of messages from multiple message boards at multiple URLs into a single rich web page, including content initially is hidden and that may be displayed essentially instantaneously by the web browser client 140 without the need to make an additional access to the server 112, is made convenient by the increasing availability of broadband connectivity to users. Such broadband connectivity increasingly is available not only through wired networks at home and in the workplace but also through wireless networks accessible using mobile computing devices. By making it feasible for the client web browser 140 to download content-rich web pages without causing the user 142 to incur a significant delay before the web page is displayed, broadband connections allow the web browser 140 to provide a degree of interactivity in web pages that approaches or even matches that previously available only in client-side applications.

Note that the use of a tooltip is provided merely as an example and does not constitute a limitation of the present invention. Rather, the additional summary information may be provided in other forms, such as in a static object (e.g., a text box) on the web page 300. Furthermore, the user 142 may cause the additional summary information to be displayed using actions other than hovering, such as clicking or pressing a hotkey.

The tooltip, or other graphical user interface element that is used to display additional summary information, may be variable in size. For example, the web page 300 may allow the user 142 to select from among three sizes: small, large, and very large. The very large size may be particularly useful for users who are visually impaired. Such a feature may make it possible for visually impaired users to benefit from the features of the web page 300, without requiring the design of the web page (e.g., the font size of text in the table) to change.

Furthermore, the web page 300 may be implemented such that selecting (e.g., hovering or clicking) one of the message summaries in the table 302 always causes the corresponding message to be displayed in the frame 308, while the additional summary information (e.g., tooltip) is displayed. Although there may be some delay in loading and displaying the full message in the frame 308, the user 142 may view the additional summary information essentially immediately, thereby enabling the user 142 to decide quickly whether to wait for the remainder of the message to load or to move on to the next message summary.

The web page 300 may allow the user 142 to post additional messages to any-of the source message boards. For example, in the embodiment illustrated in FIG. 3, the web page 300 includes an "Add Message" button 330 that the user 142 may click to add a new message. When the user 142 clicks the button 330, a web page may be displayed which allows the user 142 to type a new message and submit it either to the internal message board 114 or to one of the external message boards 102*a*-*m*. In either case, once the user 142 has posted a new message, the message may be displayed in the frame 308, and a summary of the message may be displayed in the table 302.

Similarly, the web page 300 may include a "Reply Message" button (not shown in FIG. 3) that the user 142 may click to reply to the message currently being shown in the frame 308. When the user 142 submits a reply, the reply may be posted to the same message board as the message to which the user 142 has replied, whether that message board is external or internal to the aggregation server 112. Alternatively, the user 142 may be allowed to choose whether to reply from the internal message board 114 maintained by the aggregation server 112 or from the external message board currently displayed in the frame 308.

Message summaries in the message table 302 may be sorted in any manner. For example, the summaries may be sorted by time of posting by default. The user 142 may, however, sort these messages in other ways (e.g., by message title, message author, message ID, message sentiment, message web page source, person being replied to). If the message table 302 includes message summaries derived from multiple source message boards, the message table 302 may nonetheless display the summaries in an aggregated sorted list. For example, the summaries may be sorted by time of posting, in which case message summaries corresponding to messages from different source message boards may be interwoven with each other according to the times at which they were posted. This feature provides the user 142 with a unified view of messages across multiple message boards.

Among the advantages of the invention are one or more of the following. The features of the web page 300 illustrated in FIG. 3 provide an improvement in speed and ease of use when accessing message table content and corresponding message content, in comparison to conventional systems for performing such functions. In particular, the web page 300 both allows the user 142 to view a message summary and corresponding message content contemporaneously, and to quickly scan additional message summary information not contained in the table 302.

Furthermore, the techniques disclosed herein make it possible to read and write messages from and to multiple message board sources. Writing messages can be performed either from the web page 300, or at the original message board source in the frame 308. This saves the user 142 time in comparison to reading and writing multiple message boards using distinct web browser windows for each message board.

By providing features that are attractive and useful to frequent users of financial message boards, the techniques disclosed herein provide an opportunity to generate significant revenue from advertising. An example of a banner advertisement 332 for a financial services firm is shown on the web page 300 in FIG. 3. Note, however, that the web page 300 (and the web site of which it is a part) may generate revenue using any mechanism, not merely banner advertisements.

Furthermore, note that content other than an advertisement may occupy the space occupied by the advertisement 332 in FIG. 3. For example, the aggregation server 112 may display an advertisement for basic (i.e., non-paid) users, but display additional summary information (such as the information displayed by the tooltip 328 in FIG. 3) in a static object (such as a text box) in the same location as but instead of the advertisement 332 for premium (i.e., paid) users. The web page 300, in other words, may be designed to make efficient use of available screen "real estate" to tailor the content that is displayed in an attempt to maximize revenue.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, the functions performed by the aggregation server 112 shown in FIG. 1 may be further subdivided into additional components for performing the same functions.

Although certain examples disclosed herein relate to financial message boards, the present invention is not limited to such examples. More generally, the techniques disclosed herein may be applied to any kind of messaging system, such as email and newsgroups, and to messaging systems containing messages whose content does not relate to finance. Furthermore, the techniques disclosed herein may be applied to aggregate content from web sites and other communications systems that are not designed as message boards. For example, the techniques disclosed herein may be used to aggregate news articles posted to news web sites, such as the web site for the New York Times (www.nytimes.com) or the Business Week (www.businessweek.com), even though such web sites are not designed as message boards to which members of the public may post messages. The term "message", as used herein, therefore, includes not only messages posted to message boards, but more generally to any unit of communication, such as an email message, a newsgroup posting, or a news article posted by an administrator to a news web site.

As described above, the aggregation server 112 extracts certain information from source message boards to produce the message content units 132. Examples of categories from which information may be derived include, but are not limited to: message title, message author, message identifier, message sentiment, message timestamp, message web address, message thread, message attribute (e.g., size), message link (links contained in the message), message keyword (keywords contained in the message), message recipient, and message statistics (e.g., the number of times others have recommended the message, or a rating of the popularity of the message). The user 142 may be allowed to sort the aggregated message summaries displayed in the message table 302 by, for example, any of the categories mentioned above.

Ease of visual cognition is key to a successful user interface. Various techniques may be combined with those described above to improve such ease of visual cognition. For example, message summaries in the table 302 may be color-coded or otherwise coded (such as by the use of distinct icons or words) according to their source or to any other attribute, such as according to any of the categories mentioned above. The table 302 may include any number of rows and columns. Columns may be assigned to message categories (attributes) in any way. For example, a single column may correspond to a single attribute or to multiple attributes. For example, in one embodiment, there are two columns: (1) title and (2) time and author.

The web browser 140 is not limited to any particular web browser application. The web browser 140 may, for example, be of any kind and operate on any kind of device (e.g., desktop computer, laptop computer, personal-digital assistant, or smart phone). Furthermore, although the network 138 in FIG. 1 is labeled as the "Internet," the web browser 140 and aggregation server 112 may communicate over any kind of network, such as a private intranet.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Figure 4A:
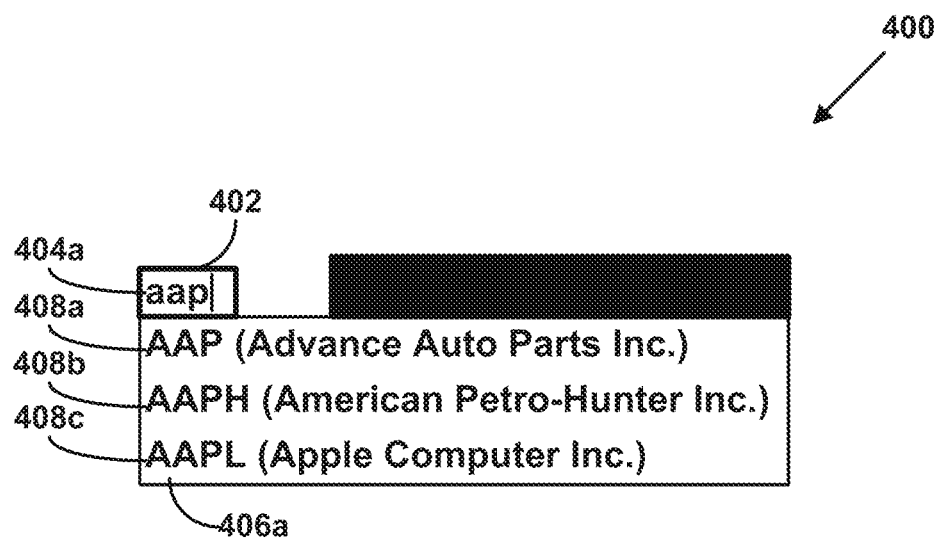
FIGS. 4A-4C are illustrations of a graphical user interface text input control for use in assisting in the completion of text input by a user according to embodiments of the present invention.

Referring to FIG. 4A, an illustration is shown of a graphical user interface text input control 400 for use in assisting in the completion of text input by a user according to one embodiment of the present invention. The control 400 includes a text input field 402 into which the user may type text.

In the particular embodiment illustrated in FIG. 4A, the text input field 402 is used for entering either the name of a company or the stock ticker symbol of the company. The text input field 402 may, for example, be implemented in a financial message board aggregation web site of the kind described in the above-referenced patent application entitled "Message Aggregator", now issued under U.S. Pat. No. 7,529,795. The text input field 402, however, may be used for entering text of any kind, and is not limited to use in any particular kind of computer program (such as a web browser).

For purposes of the following discussion, however, assume that the text input field 402 is used to enter either the name of a company or the stock ticker symbol of the company. The program that provides the text input field 402 may maintain a list of ticker-name tuples. For example, one tuple may include the stock ticker symbol "AAP" and the name of the company having that stock ticker symbol, namely "Advance Auto Parts Inc." Another tuple may, for example, include the stock ticker symbol "AAPH" and the name of the company having that stock ticker symbol, namely "American Petro-Hunter Inc." Yet another tuple may, for example, include the stock ticker symbol "AAPL" and the name of the company having that stock ticker symbol, namely "Apple Computer Inc."

In the particular example illustrated in FIG. 4A, the user has begun to type the text "aap". As the user types, the program that provides the text input field 402 may attempt to match the text that the user has typed so far against any of the text in the tuples maintained by the program. For example, the program may attempt to match the text typed by the user so far against both the stored list of stock ticker symbols and the list of corresponding company names.

If the program determines that the text typed by the user so far matches any of the text in a particular tuple, the program may indicate such a match to the user. For example, if the program determines that the text typed by the user so far matches either the stock ticker symbol or the company name of a particular tuple, the program may indicate to the user that a match has been found. If matches are found with text in multiple tuples, the program may indicate to the user that multiple matches have been found.

In the particular embodiment illustrated in FIG. 4A, any matches are indicated to the user by displaying a list of matching tuples, consisting of the stock ticker name followed by the company name (in parenthesis) of each matching tuple. For example, in FIG. 4A, the text typed so far by the user ("aap") matches three stock ticker symbols ("AAP", "AAPH", and "AAPL"). The program therefore displays the text 408a-c of the three matching tuples in the list 406a. It should be appreciated that the contents of the list may change as the user continues to type additional characters in the text input field 402 or as the user deletes previously-typed characters in the text input field 402.

Furthermore, the subset of each text item in the list that matches the input text may be visually emphasized. For example, in FIG. 4A, the text "AAP" may be highlighted (such as by color coding) in each of the matching text strings 408a, 408b, and 408c. Highlighting the matching text in this way enables the user to quickly recognize the basis of each match, thereby enabling the user to quickly determine whether any of the displayed text strings 408a-c corresponds to the company for which the user was searching.

Figure 4B:
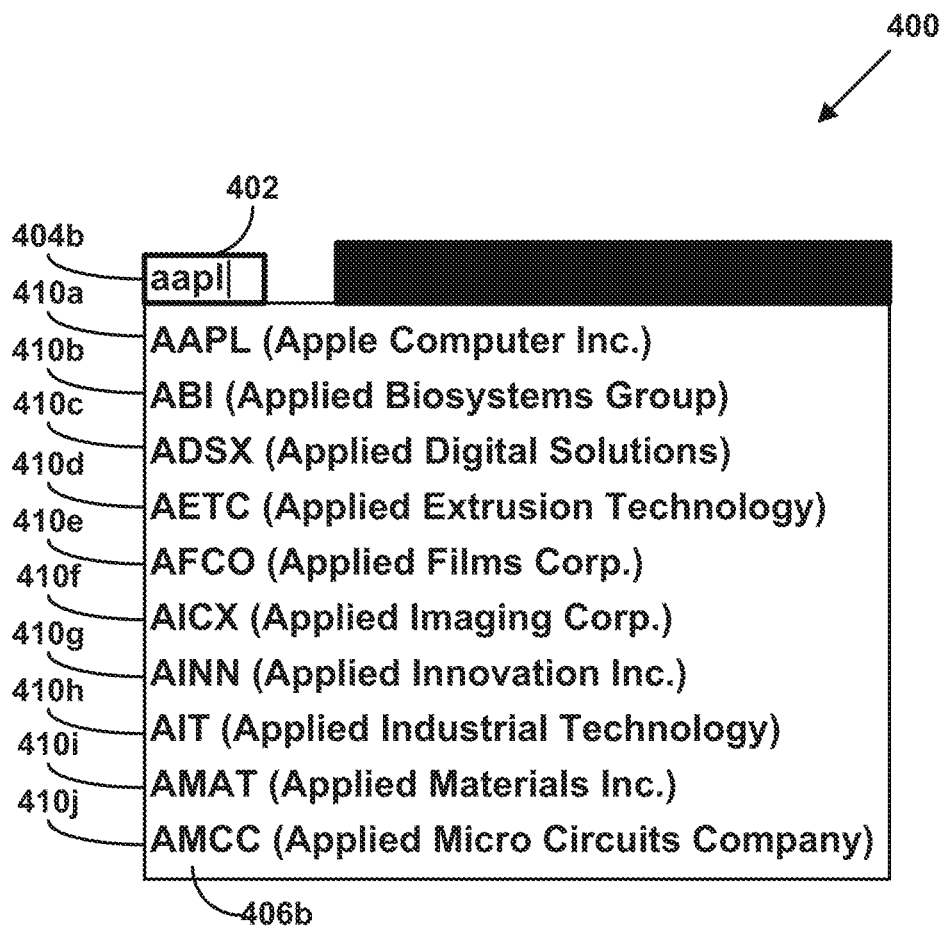

In the particular example illustrated in FIG. 4A, the text 404a typed by the user in the text input field 402 only matches stock ticker symbols in the set of stored tuples. Referring to FIG. 4B, an example is illustrated in which the text 404b ("appl") typed by the user matches company names (e.g., "Apple Computer Inc.", "Applied Biosystems Group", and "Applied Digital Solutions") instead of stock ticker symbols. The list 406b displayed in FIG. 4B, therefore, includes text 410a-j corresponding to tuples having company names that match the typed text 404b. Although the list 406b is sorted by stock ticker symbol, the list 406b may be organized in any manner. For example, the list 406b may be sorted by company name. Note that the list 406b displayed in FIG. 4B may be generated dynamically while the user types the text 404b in the same manner as described above with respect to the list 406a of FIG. 4A, namely by attempting to match the text 404b against both stock ticker symbols and company names.

Figure 4C:
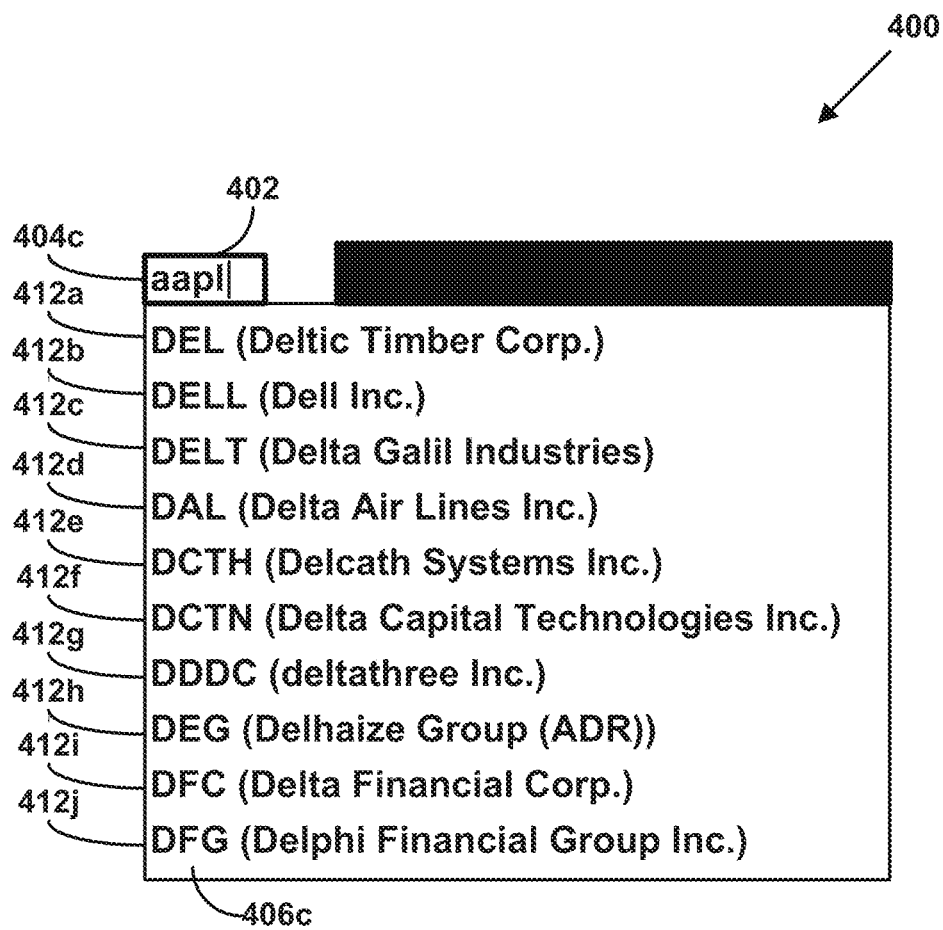

Referring to FIG. 4C, an example is illustrated in which the text 404c ("del") typed by the user matches both ticker symbols (i.e., "DEL", "DELL", and "DELT") and company names (i.e., "Delcath Systems Inc.", "Delta Capital Technologies Inc.", "deltathree Inc.", "Delhaize Group (ADR)", "Delta Financial Corp.", and "Delphi Financial Group Inc."). The list 406c displayed in FIG. 4C, therefore, includes both text 412a-c corresponding to tuples having ticker symbols that match the typed text 404c and text 412d-j having company names that match the typed text 404c.

Although the list 406c includes two sections—one for matching ticker symbols and one for matching company names—the list may be organized in any manner. For example, the list 406c may be a single list sorted by company name or ticker symbol.

Once a list of matching tuples has been displayed (such as any of the lists 406a-c illustrated in FIGS. 4A-4C), the program may allow the user to select a tuple from the list to complete the text being typed in the text input field 402. For example, if the user clicks on an item in the list, the program may fill in the text field 402 with the stock ticker symbol of the tuple selected by the user. Note, however, that when the user selects a tuple from the list, the program may fill in the text field 402 with a stock ticker symbol even though the user had begun to type a company name, or vice versa. The user may also select more than one of the output strings by using the shift or control key while selecting a subset of the desired output strings.

The techniques disclosed herein may be used to reduce the number of keystrokes required to be input by the user. This may save the user effort and enable the user to use the corresponding computer program more quickly. For example, in comparison, conventional financial portal web sites typically provide a "symbol lookup" feature that allows a user to find the stock ticker symbol for a company by typing the company's name, and then clicking on a "find" button. Examples of existing financial portal web sites, some of which provide some form of "symbol lookup" feature, but which do not include the kind of lookup features disclosed herein, include: http://moneycentral.msn.com/investor/common/find.asp?NextPage=/detail/stock quote, http://finance.yahoo.com/lookup, http://money.cnn.com/quote/lookup/index.html, http://www.marketwatch.com/tools/quotes/lookup.asp,http://clearstation.etrade.com/cgibin/ symbolsearch, http://www.marketcenter.com/std/search.action, http://www.marketcenter.com/std/toolbox.jsp, http://www.quote.com/qc/lookup/symbolsearch.aspx, http://www.wallstreettape.com/charts/custom/symbollookup.asp, http://online.wsj.com/public/us, http://online.barrons.com/public/main, http://bigcharts.marketwatch.com/symbollookup/symbollookup.asp, http://www.esignalcentral.com/support/symbol/default.asp, http://www.hoovers.com/free/, http://www.bloomberg.com/apps/tkrlookup, http://www2.barchart.com/lookup.asp, http://stockcharts.com/index.html, http://tools.thestreet.com/tsc/quotes.html?pg=qcn&, http://www.earningswhispers.com/tickerlookup.asp, http://www.whispernumber.com/index.jsp, http://www.google.com, http://quote.morningstar.com/TickerLookup.html, http://www.fool.com, http://www.siliconinvestor.com, http://www.investorshub.com, http://www.ragingbull.com, http://www.boardcentral.com, http://www.briefing.com/, http://www.newyorktimes.com, http://www.washingtonpost.com, http://www.boston.com, http://www.ft.com, http://news.bbc.co.uk/, http://www.inc.com, http://www.forbes.com, http://www.fortune.com, http://research.businessweek.com/ticker/create_ticker.asp, http://www.etrade.com, http://www.ameritrade.com, http://www.schwab.com, http://www.scottrade.com, http://www.sharebuilder.com, and http://www.vanguard.com, http://seekingalpha.com/, http://portfolios.abcnews.go.com/guotes/getQuote, http://www.investorvillage.com/home.asp, http://www.tickertech.com/cgi/?a=lookup, http://www.investors.com/symbol.asp, http://www.cboe.com/DelayedQuote/Symbol.aspx, http://personal.fidelity.com/research/stocks/content/stocksind ex.shtml?bar=c, http://www.quicken.com/investments/ts1/, http://www.globeinvestor.com/static/hubs/lookup.html, http://www.usatoday.com/money/searchtips.htm, http://stockhouse.com/, http://www.thelion.com/, http://www.island.com/, http://www.zacks.com/, http://www.troweprice.com/common/indexHtml3/0,0,htmlid=38,00.html, http://www.amex.com/?href=/quickquote/SymbolLookup.jsp, http://www.nasdaq.com, http://www.nyse.com/, http://www.londonstockexchange.com/en-gb/, http://www.euronext.com, http://www.tsx.com/, http://www.asx.com.au/, http://www.advfn.com, http://www.mldirect.ml.com, http://www.foxnews.com/business/index.html, http://www.quickandreilly.com/, http://www.economist.com/index.html, http://www.kiplinger.com/, http://www.pennystock.com/, http://www.wallstreetselect.com/, http://www.sec.gov/edgar.shtml, http://www.edgar-online.com/, http://freeedgar.com/, http://www.thedeal.com, http://www.investools.com, http://www.activetradermag.com/, http://www.traders.com/, and http://www.ipohome.com.

The techniques disclosed herein may also provide the user with a beneficial degree of flexibility. For example, the techniques disclosed herein provide the user with the flexibility to type either a stock ticker symbol or a company name, depending on the user's preference, or depending on which of the two the user remembers most easily. The user, therefore, is not limited to a particular mode of input dictated by the program. This may make the program easily usable by different classes of users, such as both those users who are sophisticated stock traders (and therefore likely to remember stock ticker symbols) and less sophisticated users (who are likely to remember company names rather than symbols). More generally, the techniques disclosed herein reduce the need for the user to rely on his memory to provide necessary textual input.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain examples described herein use stock ticker symbol and company name as the categories of text strings stored in n-tuples, the techniques disclosed herein may be applied to text strings representing any categories of content. For example, company sector (or other means of categorizing a company) is another example of a category of content to which the techniques disclosed herein may be applied.

Although particular examples disclosed herein involve the use of pairs of text strings, such pairs are merely special cases of n-tuples, in which n=2. The techniques disclosed herein may be applied more generally, to n-tuples where n>1. Furthermore, the text in the tuples may be of any kind and have any relationship to each other. For example, although stock ticker symbols typically have some textual similarity to the corresponding company names, this is not required. For example, an n-tuple may include a person's name and the person's street address, in which case there may be no textual similarity between the various text strings in the n-tuple.

In certain examples disclosed herein, the text typed by the user is matched against the beginning (leading characters) of text in the n-tuples. This is not, however, a requirement of the present invention. Rather, matching may be performed by comparing any subset of the text typed by the user against any subset of the n-tuple text. Furthermore, matching need not be performed against all elements in an n-tuple, or in the same manner against all elements in an n-tuple. For example, if n=3, matching may be performed against two rather than three of the text strings in the n-tuple. Although certain examples disclosed herein provide the user with an indication of matches by displaying a list of all text in matching n-tuples, this is not a requirement of the present invention. Rather, matches may be displayed in a form other than a list. Furthermore, displayed matches need not display all of the text in matching tuples. The user may be allowed to select a matching tuple using any kind of input mechanism.

Any kind of computer program may implement the techniques disclosed herein. For example, the techniques disclosed herein may be implemented in a web site displayed by a web browser.

Although the concept of an n-tuple is used herein, the techniques disclosed herein may be implemented without storing data in structures organized as n-tuples. Rather, the techniques disclosed herein may be implemented using any kind of data structure, such as linked lists. The data against which the user input is matched may be pre-stored, downloaded over a network connection, generated on-the-fly, or produced, stored, and processed in any suitable manner.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device.

Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

A computer program provides a first set of representations (e.g., textual representations) of a first set of hyperlinks. In response to selection by a user of one of the first set of hyperlink representations (such as by clicking on or hovering a cursor over the representation), the program displays a second set of representations (e.g., graphical representations) of a second set of hyperlinks. The user may select one of the second set of representations, in response to which the program navigates to the destination of the hyperlink. The second set of representations may, for example, be logos of companies, and the second set of hyperlinks may be hyperlinks to the companies' web sites.

Figure 5A:
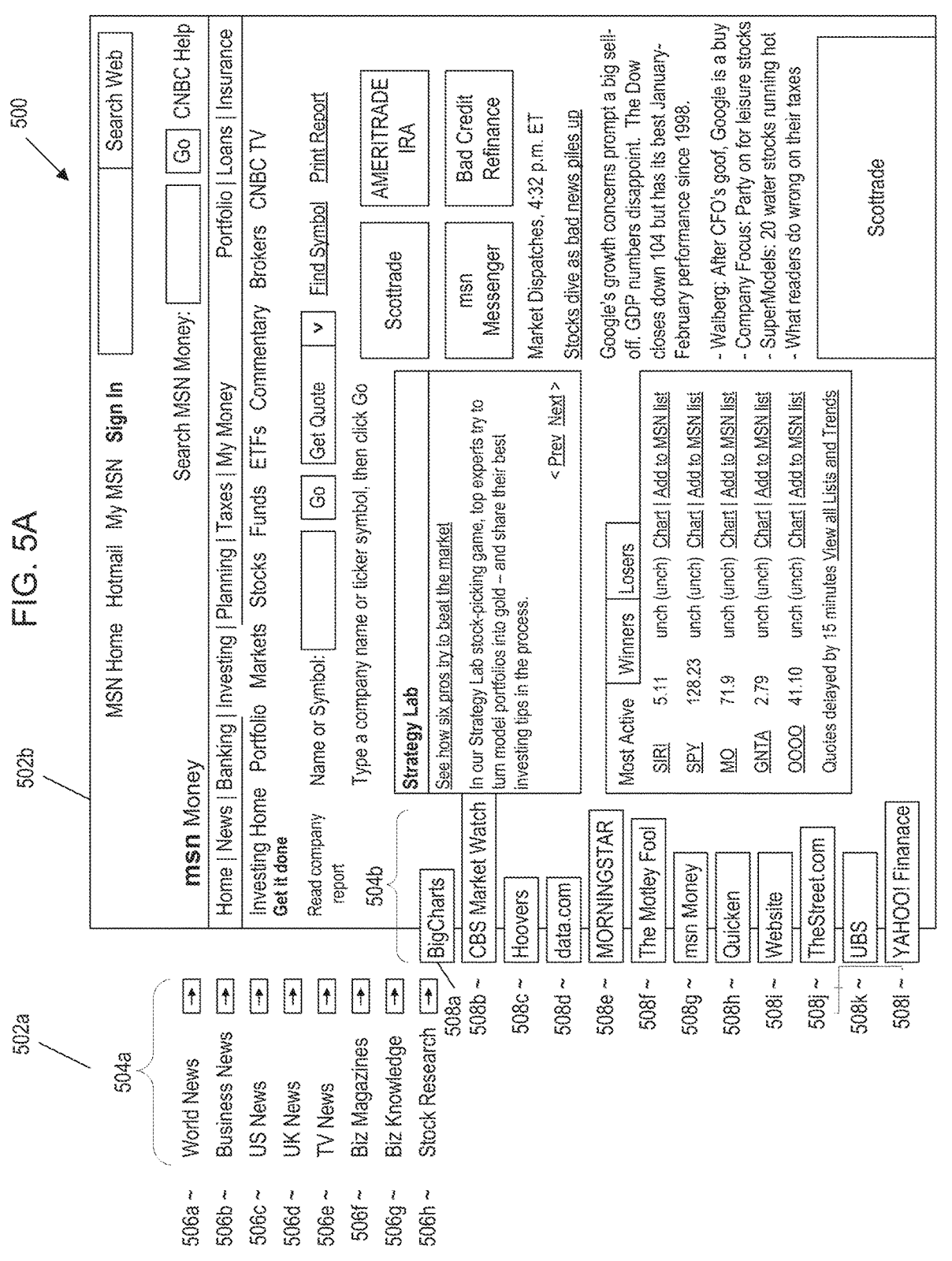

For example, referring to FIG. 5A, a web page 500 is shown according to one embodiment of the present invention. The web page 500 includes a first frame 502a displaying a first set of textual hyperlink representations 504a, and a second frame 502b displaying the contents of another web page.

In the embodiment illustrated in FIG. 5A, the first set of hyperlink representations 504a includes hypertext 506a-h. In this example, the hypertext 506a-h includes text representing categories of news web sites. For example, hypertext 506a ("World News") represents the category of world news web sites, hypertext 506b ("Business News") represents the category of business news web sites, and so on. The particular number, selection, and categorization of hypertext 506a-h shown in FIG. 5A is provided merely as an example and does not constitute a limitation of the present invention.

The hyperlink representations 504a enable the user to access the underlying hyperlinks to external websites by hovering over selecting any of the hypertext 506a-h. The user may, for example, select a particular link either by clicking on one of the hypertext links 506a-h or by hovering a mouse cursor over one of the hypertext links 506a-h.

In response to receiving a selection of one of the hypertext links 506a-h from the user, the web page 500 displays a second set of hyperlink representations 504b. In the particular example illustrated in FIG. 5A, the user has clicked on or hovered the mouse cursor over hypertext 506h ("Stock Research"). In response, the web page 500 has displayed the second set of hyperlink representations 504b, which represent hyperlinks within the selected category. In other words, each of the hyperlink representations 508a-l represents a hyperlink to a stock research web site. More specifically, in the embodiment illustrated in FIG. 5A, each of the hyperlink representations 508a-l is a graphic image of the logo of the web site that is the destination of the hyperlink. For example, hyperlink representation 508a is the logo of www.bigcharts.com, and the hyperlink representation 508a acts as a link to www.bigcharts.com.

Therefore, when the user selects (e.g., clicks on or hovers over) one of the second set of hyperlink representations 508a-l, the web browser displays the destination of the selected hyperlink in the frame 502b. For example, if the user selects hyperlink representation 508a (i.e., the logo of www.bigcharts.com), the web browser will navigate to and display the home page of www.bigcharts.com in frame 502b.

Figure 5B:

Different sets of hyperlinks are displayed as the user selects (e.g., clicks on or hovers over) different ones of the first set of hyperlinks 506a-h. For example, as shown in FIG. 5B, when the user selects hyperlink 506d ("UK News"), the web page 500 displays a set 504c of hyperlink representations 510a-j depicting logos of UK news web sites. If hovering is enabled to activate the first set 504a of links 506a-j, the user may quickly view the links in different categories by moving the mouse cursor over different ones of the first set 504a of links 506a-h. In a web browser, such a feature may be enabled using AJAX technology, through which all of the logos may be pre-downloaded with the web page 500, and then quickly displayed to the user without requiring additional accesses to the server.

The techniques just described may, for example, be implemented in conjunction with a message board aggregation web site of the kind disclosed in the patent application entitled, "Message Board Aggregator", now issued under U.S. Pat. No. 7,529,795.

One advantage of the techniques disclosed herein is that hyperlink representations (e.g., the hyperlinks 504b and 504c) may be displayed to the user essentially instantaneously. Such techniques, therefore, provide the user with a method of scanning through links that is more intuitive and thus quicker for users than traditional techniques. Furthermore, the use of company logos or other graphical representations of hyperlinks facilitates the users experience, because it is likely that the user will already associate the company logo with the corresponding company name (attached to the hyperlink). The method is also visually more appealing than commonly used plain text methods.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, the functions performed by the aggregation server 112 shown in FIG. 1 may be further subdivided into additional components for performing the same functions.

The first set of hyperlinks 504a may be sorted into categories, sub-categories, and so on, in any manner. Alternatively, they may be unsorted. The hyperlinks that are displayed may be predetermined by the web page designer, determined by the user, or any combination thereof. The user may, for example, be provided with the ability to set up categories (and subcategories) comprising favorite website hyperlinks.

Any kind of computer program may implement the techniques disclosed herein. For example, the techniques disclosed herein may be implemented in a web site displayed by a web browser.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method, comprising:
providing a web page including a set of one or more representations of one or more menu items and a set of one or more representations of one or more hyperlinks, the web page configured to:
cause display of the set of one or more representations of one or more menu items of the web page without any images being used in the display of the set of one or more representations of one or more menu items in connection with the web page, and with the set of one or more representations of one or more hyperlinks being initially hidden and taking the form of hypertext including one or more textual representations of one or more hyperlinks,
allow receipt of a first input, in the form of hovering, that indicates a selection of one of the set of one or more representations of one or more menu items,
cause, in response to receipt of the first input indicating the selection of the one of the set of one or more representations of one or more menu items, display of the set of one or more representations of one or more hyperlinks, such that the set of one or more representations of one or more hyperlinks is displayed in a menu in a same window as the one of the set of one or more representations of one or more menu items, and at least partially below the one of the set of one or more representations of one or more menu items,
allow receipt of a second input that indicates a selection of one of the set of one or more representations of one or more hyperlinks, and
cause, in response to receipt of the second input indicating the selection of the one of the set of one or more representations of one or more hyperlinks, display of another web page that corresponds to the one of the set of one or more representations of one or more hyperlinks and that includes at least a portion of content along with another instance of the set of one or more representations of one or more menu items, so as to allow review of the another instance of the set of one or more representations of one or more menu items and review of another instance of the set of one or more representations of one or more hyperlinks while the at least portion of content is displayed, for use in causing display of yet another web page that includes at least a portion of additional content along with yet another instance of the set of one or more representations of one or more menu items; and
causing storage of the web page.

2. The method of claim 1, wherein the absence of any images in the display of the set of one or more representations of one or more menu items reduces a download time associated with a pre-download of the set of one or more representations of one or more hyperlinks with the web page.

3. The method of claim 1, wherein the set of one or more representations of one or more hyperlinks is displayed so as to overlap at least a portion of a content section of the web page.

4. The method of claim 1, wherein use of the one or more textual representations minimizes an amount of data required to pre-download the set of one or more representations of one or more hyperlinks with the web page.

5. The method of claim 1, wherein the another instance of the set of one or more representations of one or more menu items is displayed in a first portion of the another web page, the at least portion of content is displayed in a second portion of the another web page, and at least part of the first portion including at least a portion of the another instance of the set of one or more representations of one or more hyperlinks overlaps at least part of the second portion.

6. The method of claim 1, wherein a distance between multiple of the set of one or more representations of one or more hyperlinks remains constant before and after the display of the set of one or more representations of one or more hyperlinks.

7. The method of claim 1, wherein the receipt of the first input is allowed without Asynchronous-JavaScript-and-XML (AJAX) for improving a speed of the receipt of the first input and the display of the set of one or more representations of one or more hyperlinks.

8. The method of claim 1, wherein each instance of the receipt and the display causation is performed without invoking Asynchronous-JavaScript-and-XML (AJAX).

9. The method of claim 1, wherein an entirety of the web page is generated without using Java.

10. The method of claim 1, wherein the first input is capable of including the hovering, or clicking.

11. The method of claim 1, wherein the hovering permits a user to more quickly view different sets of one or more representations of different one or more hyperlinks, as compared to clicking, by permitting the user to move a cursor over different sets of one or more representations of different one or more menu items.

12. The method of claim 1, wherein the web page includes at least one search field that works in connection with code to, in response to a receipt of search user input, cause display of one or more search results based on n-tuples, where n is greater than or equal to one.

13. The method of claim 1, wherein the web page includes at least one search field that works in connection with code to, in response to a receipt of search user input, cause display of one or more search results based on n-tuples, where n is greater than or equal to two.

14. The method of claim 1, wherein at least one of:
the set of one or more representations of one or more menu items includes a set including a single representation of a single menu item;
the web page includes a single web page;
the web page is one of a plurality of web pages;
the one or more representations of one or more hyperlinks is displayed below and to a side of the one of the set of one or more representations of one or more menu items;
the one of the set of one or more representations of one or more hyperlinks is displayed immediately below the one of the one of the set of one or more representations of one or more menu items;
the one or more representations of one or more hyperlinks is displayed below the one of the set of one or more representations of one or more menu items, by the one or more representations of one or more hyperlinks being displayed at a first level that is below a second level that the one of the set of one or more representations of one or more menu items is displayed;
the one or more representations of one or more hyperlinks is displayed below the one of the set of one or more representations of one or more menu items, by the one or more representations of one or more hyperlinks being displayed on a first y-axis plane that is below a second y-axis plane that the one of the set of one or more representations of one or more menu items is displayed;
the one or more representations of one or more hyperlinks is displayed below the one of the set of one or more representations of one or more menu items, by the one or more representations of one or more hyperlinks being displayed at a first location on an x-axis on a first y-axis plane that is below a second location on the x-axis on a second y-axis plane at which the one of the set of one or more representations of one or more menu items is displayed;
the at least portion of content is different from the at least portion of additional content;
the at least portion of content is the same as the at least portion of additional content;
the set of one or more representations of one or more hyperlinks is displayed in the menu in a first frame of the same window, and the one of the set of one or more representations of one or more menu items is displayed in a second frame of the same window;
the set of one or more representations of one or more hyperlinks and the one of the set of one or more representations of one or more menu items, are displayed in the same frame of the same window;
the set of one or more representations of one or more hyperlinks and the one of the set of one or more representations of one or more menu items, are displayed in the menu;
the set of one or more representations of one or more hyperlinks and the one of the set of one or more representations of one or more menu items, are displayed in different menus;
other one or more portions of the web page other than the set of representations of one or more menu items include images;
the one or more menu items include one or more hyperlinks;
other one or more portions of the web page other than the set of representations of one or more menu items, including the content, include images;
other one or more portions of the web page other than the set of representations of one or more menu items, including the set of one or more representations of one or more hyperlinks, include images;
images other than the any images are pre-downloaded with the web page;
images are pre-downloaded with the web page for use in the display of the set of representations of one or more hyperlinks;
the second input includes the hovering;
additional input other than the first input and the second input, includes the hovering;
the hovering results in a visual emphasis;
the hovering results in content display;
the hovering results in display of at least a portion of content that was previously hidden;
each instance of the set of one or more representations of one or more menu items is identical;
the another instance of the set of one or more representations of one or more menu items has at least one difference with respect to the set of one or more representations of one or more menu items;
the another instance of the set of one or more representations of one or more menu items and the set of one or more representations of one or more menu items, are displayed with different content;

the yet another instance of the set of one or more representations of one or more menu items, the another instance of the set of one or more representations of one or more menu items, and the set of one or more representations of one or more menu items, are each displayed with different content;

the yet another instance of the set of one or more representations of one or more menu items, the another instance of the set of one or more representations of one or more menu items, and the set of one or more representations of one or more menu items, are identical in at least one respect;

the yet another instance of the set of one or more representations of one or more menu items, the another instance of the set of one or more representations of one or more menu items, and the set of one or more representations of one or more menu items, are different in at least one respect;

each instance of the set of one or more representations of one or more hyperlinks is identical;

the another instance of the set of one or more representations of one or more hyperlinks has at least one difference with respect to the set of one or more representations of one or more hyperlinks;

the another instance of the set of one or more representations of one or more hyperlinks and the set of one or more representations of one or more hyperlinks, are displayed with different content;

the web page, the another web page, and the yet another web page are on a same website;

the set of one or more representations of one or more menu items and the at least portion of content are simultaneously displayed in separate frames;

the set of one or more representations of one or more menu items and the at least portion of content are simultaneously displayed in at least one frame;

the set of one or more representations of one or more menu items and the at least portion of content are simultaneously displayed in a same frame;

the set of one or more representations of one or more hyperlinks are pre-downloaded with the web page by being downloaded prior to the first input;

the web page is part of a system including a server;

the web page is part of a system including a server on which the web page is stored and from which the web page is served;

the web page is part of a system including a server;

the web page is part of a system including a user computer to which the web page is served and stored;

the web page is stored on a user computer;

the web page is stored on a server; or the at least a portion of the content includes a text item; and further comprising: providing a display for being caused, by the web page, to display: the set of one or more representations, the set of one or more representations of one or more hyperlinks, the another web page, and the yet another web page; and further comprising: providing an input device for being used, in connection with the web page, to allow receipt of: the first input, and the second input; and further comprising: providing a storage device for storage of the web page.

15. The method of claim 1, wherein the set of one or more representations of one or more hyperlinks is caused to be displayed as a vertical list of the one or more representations of one or more hyperlinks.

16. The method of claim 1, wherein the set of one or more representations of one or more hyperlinks is caused to be displayed as a vertical list of the one or more representations of one or more hyperlinks, in order to avoid confusion with the set of one or more representations of one or more menu items.

17. The method of claim 1, wherein the menu items include hyperlinks.

18. The method of claim 1, wherein the web page is part of a website, the website being configured to:
display a plurality of user interface elements including a first user interface element and a second user interface element;
allow receipt of user input that indicates a selection of the first user interface element;
in response to the receipt of user input that indicates the selection of the first user interface element, display a first user interface;
allow receipt of a first message utilizing the first user interface;
cause the first message to sent, such that the first message is displayed with other messages on another web page of another website associated with a separate first on-line forum;
allow receipt of user input that indicates a selection of the second user interface element;
in response to the receipt of user input that indicates the selection of the second user interface element, display a second user interface;
allow receipt of a second message utilizing the second user interface; and
cause the second message to sent, such that the second message is displayed with yet other messages on yet another web page of yet another website associated with a separate second on-line forum.

19. The method of claim 18, wherein the website is configured to: cause display of a field for conducting a search in connection with at least a portion of information associated with the website; allow receipt of a plurality of characters of text utilizing the field; cause a determination whether the characters match any of n text strings in at least one of a plurality of n-tuples, with n being greater than or equal to one (1); and cause, in response to it being determined that the characters match any of the n text strings in the at least one of the plurality of n-tuples, an indication that the match has been found.

20. The method of claim 1, wherein the display of the another web page is caused, so as to allow the review of the another instance of the set of one or more representations of one or more hyperlinks, in response to receipt of a third input indicating a selection of one of the another instance of the set of one or more representations of one or more menu items.

21. The method of claim 1, wherein a distance between multiple of the set of one or more representations of one or more menu items remains constant before and after the display of the set of one or more representations of one or more hyperlinks.

22. A method, comprising:
creating content for populating a web page, the web page including a set of one or more representations of one or more menu items and a set of one or more representations of one or more hyperlinks; and
storing the web page on at least one server, in order to:

cause display of the set of one or more representations of one or more menu items of the web page, with the set of one or more representations of one or more hyperlinks being initially hidden, allow receipt of a first input, in the form of hovering, that indicates a selection of one of the set of one or more representations of one or more menu items, cause, in response to receipt of the first input indicating the selection of the one of the set of one or more representations of one or more menu items, immediate display of the set of one or more representations of one or more hyperlinks, such that the set of one or more representations of one or more hyperlinks is displayed in a menu in a same window as the one of the set of one or more representations of one or more menu items, allow receipt of a second input that indicates a selection of one of the set of one or more representations of one or more hyperlinks, and cause, in response to receipt of the second input indicating the selection of the one of the set of one or more representations of one or more hyperlinks, display of another web page that corresponds to the one of the set of one or more representations of one or more hyperlinks and that includes at least a portion of additional content and another instance of the set of one or more representations of one or more menu items, so as to allow access to the another instance of the set of one or more representations of one or more menu items and access to another instance of the set of one or more representations of one or more hyperlinks while the at least portion of additional content is displayed with the another instance of the set of one or more representations of one or more menu items.

23. The method of claim 22, wherein the set of one or more representations of one or more hyperlinks is displayed so as to overlap at least a portion of a content section of the web page.

24. The method of claim 22, wherein the another instance of the set of one or more representations of one or more menu items is displayed in a first portion of the another web page, the at least portion of additional content is displayed in a second portion of the another web page, and at least part of the first portion includes at least a portion of the another instance of the set of one or more representations of one or more hyperlinks that overlaps at least part of the second portion.

25. The method of claim 22, wherein the set of one or more representations of one or more menu items is implemented without images and the receipt of the first input is implemented without Asynchronous-JavaScript-and-XML (AJAX), both for improving a speed of the receipt of the first input and the display of the set of one or more representations of one or more hyperlinks.

26. The method of claim 22, wherein an appearance of letters of the set of one or more representations of one or more hyperlinks does not change in response to selection user input thereon.

27. The method of claim 22, wherein the set of one or more representations of one or more menu items is implemented without images and the receipt of the first input is implemented without Java, both for improving a speed of the receipt of the first input and the display of the set of one or more representations of one or more hyperlinks.

28. The method of claim 22, wherein the web page includes at least one search field that works in connection with code to, in response to a receipt of search user input, cause display of one or more search results based on n-tuples, where n is greater than or equal to one.

29. The method of claim 22, wherein the web page includes at least one search field that works in connection with code to, in response to a receipt of search user input, cause display of one or more search results based on n-tuples, where n is greater than or equal to two.

30. The method of claim 22, wherein the receipt of the first input is allowed without Java, for improving a speed of at least one of: the receipt of the first input, or the display of the set of one or more representations of one or more hyperlinks.

31. The method of claim 22, wherein the receipt of the first input is allowed without Java, for improving a speed of the receipt of the first input and the display of the set of one or more representations of one or more hyperlinks.

32. The method of claim 22, wherein an appearance of letters of the set of one or more representations of one or more hyperlinks changes in response to selection user input thereon.

33. The method of claim 22, wherein the display of the another web page is caused; so as to allow access to the another instance of the set of one or more representations of one or more menu items, by causing display of the another instance of the set of one or more representations of one or more menu items on the another web page; and so as to allow access to the another instance of the set of one or more representations of one or more hyperlinks while the at least portion of additional content is displayed with the another instance of the set of one or more representations of one or more menu items, by causing display of the another instance of the set of one or more representations of one or more hyperlinks in response to receipt of a third input indicating a selection of one of the another instance of the set of one or more representations of one or more menu items that is caused to be displayed on the another web page.

34. A method, comprising:
providing a non-transitory computer readable medium; and
storing, on the non-transitory computer readable medium, content for at least one web page, the at least one web page including a set of one or more representations of one or more menu items and a set of one or more representations of one or more hyperlinks, and the at least one web page configured to:
cause display of the set of one or more representations of one or more menu items of the at least one web page, without any images being used in the display of the set of one or more representations of one or more menu items, and with the set of one or more representations of one or more hyperlinks being initially hidden and taking the form of hypertext including one or more textual representations of one or more hyperlinks,
allow receipt of a first input, in the form of hovering, that indicates a selection of one of the set of one or more representations of one or more menu items,
cause, in response to receipt of the first input indicating the selection of the one of the set of one or more representations of one or more menu items, display of the set of one or more representations of one or more hyperlinks,
allow receipt of a second input that indicates a selection of one of the set of one or more representations of one or more hyperlinks, and cause, in response to receipt of the second input indicating the selection of the one of the set of one or more representations of one or more hyperlinks, display of at least one other web page that corresponds to the one of the set of one or more representations of one or more hyperlinks and that includes at least a portion of additional content and the set of one or more representations of one or more menu items, so as to allow use of the set of one or more representations of one or more menu items while the at least portion of additional content is displayed with the set of one or more representations of one or more menu items.

35. The method of claim 34, wherein the at least portion of additional content and the set of one or more representations of one or more menu items are caused to be displayed in a same frame.

36. The method of claim 34, wherein the at least one web page and the at least one other web page are implemented without Java nor Asynchronous-JavaScript-and-XML (AJAX).

37. The method of claim 34, wherein the at least one web page includes at least one search field that works in connection with code to, in response to a receipt of search user input, cause display of one or more search results based on n-tuples, where n is greater than or equal to one.

38. The method of claim 34, wherein the at least one web page is part of a website, the website being configured to:
   display at least one user interface element;
   allow receipt of third user input that indicates a selection of the at least one user interface element;
   in response to receipt of the third user input that indicates the selection of the at least one user interface element, display a user interface for causing a message to be sent; and
   cause the message to sent, such that the message is displayed with other messages on another web page of another website associated with a separate on-line forum.

39. The method of claim 38, wherein:
   the message includes text generated by a user;
   the message includes a web page link; and
   the at least one user interface element includes a plurality of user interface elements for causing different messages to be sent, such that the different messages are displayed on different websites associated with different on-line forums.

40. The method of claim 38, wherein the website is configured to: cause display of a field for conducting a search in connection with at least a portion of information associated with the website; allow receipt of a plurality of characters of text utilizing the field; cause a determination whether the characters match any of n text strings in at least one of a plurality of n-tuples, with n being greater than or equal to one (1); and cause, in response to it being determined that the characters match any of the n text strings in the at least one of the plurality of n-tuples, an indication that the match has been found.

41. The method of claim 34, wherein the set of one or more representations of one or more menu items that is included with the at least one other web page is the same as the set of one or more representations of one or more menu items included with the at least one web page.

42. The method of claim 34, wherein the set of one or more representations of one or more menu items that is included with the at least one other web page appears the same as the set of one or more representations of one or more menu items included with the at least one web page.

43. The method of claim 34, wherein the set of one or more representations of one or more menu items that is included with the at least one other web page is another instance of the set of one or more representations of one or more menu items included with the at least one web page.

44. The method of claim 34, wherein the at least one web page and the at least one other web page are implemented without Java.

45. A method, comprising:
   providing content for a web page, the web page including web page code, a set of one or more representations of one or more menu items, and a set of one or more representations of one or more hyperlinks;
   causing, using the web page code of the web page, display of the set of one or more representations of one or more menu items of the web page, without any images being used in the display of the set of one or more representations of one or more menu items, and with the set of one or more representations of one or more hyperlinks being initially hidden and taking the form of hypertext including one or more textual representations of one or more hyperlinks;
   allowing, using the web page code of the web page, receipt of a first input that indicates a selection of one of the set of one or more representations of one or more menu items;
   causing, using the web page code of the web page and in response to receipt of the first input indicating the selection of the one of the set of one or more representations of one or more menu items, display of the set of one or more representations of one or more hyperlinks;
   allowing, using the web page code of the web page, receipt of a second input that indicates a selection of one of the set of one or more representations of one or more hyperlinks; and
   causing, using the web page code of the web page and in response to receipt of the second input indicating the selection of the one of the set of one or more representations of one or more hyperlinks, display of another web page corresponding to the one of the set of one or more representations of one or more hyperlinks, the another web page including at least a portion of additional content and the set of one or more representations of one or more menu items, so as to allow use of the set of one or more representations of one or more menu items while the at least portion of additional content is displayed with the set of one or more representations of one or more menu items.

46. The method of claim 45, wherein the web page includes at least one search field that works in connection with code to, in response to a receipt of search user input, cause display of one or more search results based on n-tuples, where n is greater than or equal to one.

47. The method of claim 46, wherein the web page and the another web page are implemented without Asynchronous-JavaScript-and-XML (AJAX).

48. The method of claim 46, wherein the web page and the another web page are implemented without Java nor Asynchronous-JavaScript-and-XML (AJAX).

49. The method of claim 45, wherein the web page is part of a website that includes the another web page, wherein the another web page includes at least one search field where, in response to a receipt of search user input via the at least one search field, display of one or more search results is caused based on n-tuples, where n is greater than or equal to two.

50. The method of claim 45, wherein the web page is part of a website, where the website is configured to: cause display of a field for conducting a search in connection with at least a portion of information associated with the website; allow receipt of a plurality of characters of text utilizing the field; cause a determination whether the characters match any of n text strings in at least one of a plurality of n-tuples, with n being greater than or equal to one (1); and cause, in response to it being determined that the characters match any of the n text strings in the at least one of the plurality of n-tuples, an indication that the match has been found.

51. The method of claim 50, wherein n is greater than one (1) and each of the plurality of n-tuples includes first text and second text.

52. The method of claim 51, wherein the plurality of n-tuples are sorted according to the first text independent of whether the received characters match the second text and does not match the first text.

53. The method of claim 51, wherein the first text represents a name and the second text represents a location corresponding to the name.

54. The method of claim 51, wherein the first text precedes the second text, and the indication comprises displaying the n text strings associated with the match.

55. The method of claim 50, and further comprising:
allowing receipt of third user input selecting one of the plurality of n-tuples; and
using text from the selected one of the plurality of n-tuples to complete the plurality of characters of text.

56. The method of claim 55, wherein the using comprises replacing characters typed so far with text from the selected one of the plurality of n-tuples.

57. The method of claim 55, wherein the using comprises appending text from the selected one of the plurality of n-tuples.

58. The method of claim 50, wherein the field is displayed on the web page.

59. The method of claim 50, wherein the field is displayed on another web page that is part of the website.

60. The method of claim 50, wherein the indication that the match has been found is caused in response to it being determined that the characters match any of the n text strings in the at least one of the plurality of n-tuples, without receipt of any user input other than the receipt of the plurality of characters of text utilizing the field.

61. The method of claim 50, wherein the indication that the match has been found is caused in response to it being determined that the characters match any of the n text strings in the at least one of the plurality of n-tuples, without revisiting at least one server in order to make the determination.

62. The method of claim 50, wherein the website is configured to:
display at least one user interface element;
allow receipt of third user input that indicates a selection of the at least one user interface element;
in response to receipt of the third user input that indicates the selection of the at least one user interface element, display a user interface for causing a message to be sent; and
cause a message to be sent, such that the message is displayed with other messages on another web page of another website.

63. The method of claim 62, wherein:
the message includes user-generated text;
the message includes a source of the web page; and
the at least one user interface element includes a plurality of user interface elements for causing different messages to be sent, such that the different messages are displayed on different websites associated with different on-line forums.

64. The method of claim 45, wherein the web page is part of a website, the website configured to:
display at least one user interface element;
allow receipt of third user input that indicates a selection of the at least one user interface element;
in response to receipt of the third user input that indicates the selection of the at least one user interface element, display a user interface for causing a message to be sent; and
cause the message to sent, such that the message is displayed with other messages on another web page of another website associated with a separate on-line forum.

65. The method of claim 64, wherein the at least one user interface element is displayed on the web page.

66. The method of claim 64, wherein the separate on-line forum includes an external message board.

67. The method of claim 64, wherein the message is displayed with the other messages on the another web page of the another website associated with the separate on-line forum, in chronological order.

68. The method of claim 64, wherein the message is sorted with the other messages on the another web page of the another website associated with the separate on-line forum, based on a posting time.

69. The method of claim 64, and further comprising: allowing receipt of the message utilizing the user interface.

70. The method of claim 64, wherein the message indicates a sentiment.

71. The method of claim 64, wherein the message includes text generated by a user.

72. The method of claim 64, wherein the message includes a source of the website.

73. The method of claim 64, wherein the user interface is part of a window separate from another window that displays the at least one user interface element.

74. The method of claim 73, wherein the message includes a link.

75. The method of claim 64, wherein the message includes at least a portion of the web page.

76. The method of claim 64, wherein the message includes an image.

77. The method of claim 64, wherein the separate on-line forum requires, for access thereto, a login by a user from which the third user input is received.

78. The method of claim 64, wherein the message includes at least one of a reply message, an added message, or a new message.

79. The method of claim 64, wherein the at least one user interface element includes a plurality of user interface elements for causing different messages to be sent, such that the different messages are displayed with different other messages on different other web pages of different other websites associated with different other on-line forums.

80. The method of claim 64, wherein the user interface is part of another web page separate from the web page that displays the at least one user interface element.

81. The method of claim 64, wherein the web page is part of a website, the website being configured to: cause display of a field for conducting a search in connection with at least a portion of information associated with the website, allow receipt of a plurality of characters of text utilizing the field; cause determination whether the characters match any of n text strings in at least one of a plurality of n-tuples each including n>1 text strings; and cause, in response to it being determined that the characters match any of the n text strings in the at least one of the plurality of n-tuples, an indication that the match has been found.

82. The method of claim 45, wherein the web page is part of a website, the website being configured to:
  display a plurality of user interface elements including a first user interface element and a second user interface element;
  allow receipt of third user input that indicates a selection of the first user interface element;
  in response to receipt of the third user input that indicates the selection of the first user interface element, display a first user interface;
  allow receipt of a first message utilizing the first user interface;
  cause the first message to sent, such that the first message is displayed with other messages on another web page of another website associated with a separate first on-line forum;
  allow receipt of fourth user input that indicates a selection of the second user interface element;
  in response to the receipt of fourth user input that indicates the selection of the second user interface element, display a second user interface;
  allow receipt of a second message utilizing the second user interface; and
  cause the second message to sent, such that the second message is displayed with yet other messages on yet another web page of yet another website associated with a separate second on-line forum.

83. The method of claim 82, wherein the web page is part of a website, where the website is configured to: cause display of a field for conducting a search in connection with at least a portion of information associated with the website; allow receipt of a plurality of characters of text utilizing the field; cause a determination whether the characters match any of n text strings in at least one of a plurality of n-tuples, with n being greater than or equal to one (1); and cause, in response to it being determined that the characters match any of the n text strings in the at least one of the plurality of n-tuples, an indication that the match has been found.

84. The method of claim 45, wherein each instance of the causing and the allowing is performed using the web page code, by at least one of: serving the web page code from at least one server, or storing the web page code at the at least one server.

85. The method of claim 45, wherein each instance of the causing and the allowing is performed using the web page code, by being carried out by the web page itself.

86. The method of claim 45, wherein each instance of the causing and the allowing is performed using the web page code, by the web page code being used by at least one server.

87. The method of claim 45, wherein each instance of the causing and the allowing is performed using the web page code, by the web page code being used by a client computer.

88. The method of claim 45, wherein the set of one or more representations of one or more hyperlinks is caused to be displayed as a vertical list of the one or more representations of one or more hyperlinks.

* * * * *